United States Patent
Tsai et al.

(10) Patent No.: US 11,470,581 B2
(45) Date of Patent: Oct. 11, 2022

(54) CHANNEL-BANDWIDTH-ATTRIBUTED PER-BAND USER EQUIPMENT CAPABILITY REPORTING

(71) Applicant: QUALCOMM Incorporated, San Diego, CA (US)

(72) Inventors: Shiau-He Tsai, San Diego, CA (US); Parisa Cheraghi, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 16/863,763

(22) Filed: Apr. 30, 2020

(65) Prior Publication Data

US 2020/0351858 A1    Nov. 5, 2020

Related U.S. Application Data

(60) Provisional application No. 62/842,883, filed on May 3, 2019.

(51) Int. Cl.
*H04W 72/04*    (2009.01)

(52) U.S. Cl.
CPC ............... *H04W 72/0406* (2013.01)

(58) Field of Classification Search
CPC ............ H04L 5/001; H04L 5/0048; H04L 5/0053–0057; H04L 5/0098;
(Continued)

(56) References Cited

U.S. PATENT DOCUMENTS

| 8,331,967 B2 * | 12/2012 | Iwamura | H04W 36/26 455/509 |
| 11,134,497 B2 * | 9/2021 | Li | H04W 72/042 |

(Continued)

FOREIGN PATENT DOCUMENTS

| WO | WO-2007085172 A1 * | 8/2007 | ............ H04W 28/20 |
| WO | WO-2014071601 A1 * | 5/2014 | .............. H04W 8/22 |

(Continued)

OTHER PUBLICATIONS

"3rd Generation Partnership Project, Technical Specification Group Radio Access Network, NR, User Equipment (UE) Radio Access Capabilities (Release 15)", 3GPP Standard, Technical Specification, 3GPP TS 38.306, 3rd Generation Partnership Project (3GPP), Mobile Competence Centre, 650, Route Des Lucioles, F-06921 Sophia-Antipolis Cedex, France, vol. RAN WG2, No. V15.5.0, Apr. 11, 2019 (Apr. 11, 2019), pp. 1-49, XP051723403, [retrieved on Apr. 11, 2019] Section 4.1; p. 30.

(Continued)

*Primary Examiner* — Thomas R Cairns
(74) *Attorney, Agent, or Firm* — Holland & Hart LLP

(57) ABSTRACT

Methods, systems, and devices for wireless communications are described that provide for channel-bandwidth-attributed per-band user equipment capability reporting. A user equipment (UE) may determine a first and second set of physical layer capabilities associated with a first and second channel bandwidth, respectively. The UE may transmit a first and second UE capability report to the base station, where the capability reports may indicate the corresponding channel bandwidth and may include the UE physical layer capabilities. The UE may receive control information indicating a channel bandwidth from the base station and the UE may communicate with the base station according to the received control information.

24 Claims, 15 Drawing Sheets

(58) Field of Classification Search
CPC ..... H04M 1/72406; H04W 8/20; H04W 8/22; H04W 8/24–245; H04W 36/0072; H04W 60/06; H04W 72/0406–0433; H04W 72/0453; H04W 72/048
See application file for complete search history.

(56) References Cited

U.S. PATENT DOCUMENTS

| | | | |
|---|---|---|---|
| 2014/0307649 A1* | 10/2014 | Vermani | H04L 5/0094 370/329 |
| 2017/0339554 A1* | 11/2017 | Chen | H04L 5/001 |
| 2017/0367073 A1* | 12/2017 | Murugan | H04B 1/0053 |
| 2018/0049213 A1* | 2/2018 | Gholmieh | H04W 72/1215 |
| 2018/0227904 A1* | 8/2018 | Raghunathan | H04W 72/048 |

FOREIGN PATENT DOCUMENTS

| | | | | |
|---|---|---|---|---|
| WO | WO-2015142278 A1 * | 9/2015 | | H04L 5/0091 |
| WO | WO-2018085723 A1 | 5/2018 | | |

OTHER PUBLICATIONS

International Search Report and Written Opinion—PCT/US2020/031179—ISA/EPO—Jul. 8, 2020.

* cited by examiner

CHANNEL-BANDWIDTH-ATTRIBUTED PER-BAND USER EQUIPMENT CAPABILITY REPORTING

CROSS REFERENCE

The present Application for Patent claims the benefit of U.S. Provisional Patent Application No. 62/842,883 by Tsai et al., entitled "CHANNEL-BANDWIDTH-ATTRIBUTED PER-BAND USER EQUIPMENT CAPABILITY REPORTING," filed May 3, 2019, assigned to the assignee hereof, and expressly incorporated by reference in its entirety herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Generally, wireless communications may include communicating between UEs and base stations via a communication protocol. The base station may transmit an enquiry to the UE regarding the UE capability, and after receiving the capability enquiry from the base station or network, the UE may transmit a UE capability report to the base station. The UE capability report may indicate to the base station details of the UE capabilities so that the base station may avoid requesting or configuring the UE to use a capability which may not be supported by the UE. However, the indicated UE capabilities may be overly rigid, and may be based on a narrowest set of physical layer capabilities of the UE. Improved UE capability reporting may be desired.

SUMMARY

The described techniques relate to improved methods, systems, devices, and apparatuses that support channel-bandwidth-attributed per-band user equipment capability reporting. Generally, the described techniques provide for using a channel bandwidth bitmap as an attribute, and a collection of per-band physical layer capability of a user equipment (UE). By using the same band number more than one time, distinctive sets of physical layer capabilities of the UE may be reported, for example each set of physical layer capabilities corresponding to a different channel bandwidth.

In some examples, the UE may transmit, to the base station, two separate UE capability reports for at least two different channel bandwidths for use in the same band. The base station may select one of the channel bandwidths based on the received UE capability reports. The base station may transmit, to the UE, control information indicating the selected channel bandwidth, and configure the UE based on the physical layer parameters in the UE capability reports associated with the selected channel bandwidth. The UE may receive from the base station the control information indicating the channel bandwidth and other configuration information. The UE may then communicate with the base station based on the control information. In some examples, the physical layer capabilities may be determined based on a carrier aggregation configuration such as inter-band carrier aggregation or inter-frequency range carrier aggregation.

A method of wireless communication at a UE is described. The method may include determining, for the UE, a first set of physical layer capabilities associated with a first channel bandwidth of a radio frequency spectrum band and a second set of physical layer capabilities associated with a second channel bandwidth of the radio frequency spectrum band, transmitting, to a base station, a first UE capability report indicating the first channel bandwidth and including the first set of physical layer capabilities, transmitting, to the base station, a second UE capability report indicating the second channel bandwidth and including the second set of physical layer capabilities, receiving, from the base station, control information indicating a channel bandwidth including the first channel bandwidth or the second channel bandwidth, the control information based on the first set of physical layer capabilities or the second set of physical layer capabilities for the indicated channel bandwidth, and communicating with the base station according to the received control information.

An apparatus for wireless communication at a UE is described. The apparatus may include a processor, memory coupled with the processor, and instructions stored in the memory. The instructions may be executable by the processor to cause the apparatus to determine, for the UE, a first set of physical layer capabilities associated with a first channel bandwidth of a radio frequency spectrum band and a second set of physical layer capabilities associated with a second channel bandwidth of the radio frequency spectrum band, transmit, to a base station, a first UE capability report indicating the first channel bandwidth and including the first set of physical layer capabilities, transmit, to the base station, a second UE capability report indicating the second channel bandwidth and including the second set of physical layer capabilities, receive, from the base station, control information indicating a channel bandwidth including the first channel bandwidth or the second channel bandwidth, the control information based on the first set of physical layer capabilities or the second set of physical layer capabilities for the indicated channel bandwidth, and communicate with the base station according to the received control information.

In some examples of the method, and apparatuses described herein, determining the first set of physical layer capabilities and the second set of physical layer capabilities may include operations, features, means, or instructions for identifying a carrier aggregation configuration associated with at least one of the first channel bandwidth or the second channel bandwidth, and determining at least one physical layer capability of the first set of physical layer capabilities or the second set of physical layer capabilities based on the identified carrier aggregation configuration.

In some examples of the method, and apparatuses described herein, the identified carrier aggregation configuration includes a set of component carriers within the radio frequency spectrum band, determining the first set of physical layer capabilities includes repeating, for each component carrier of the set of component carriers, capability information for the component carrier in the first UE capability report, or, determining the second set of physical layer capabilities includes repeating, for each component carrier of the set of component carriers, capability information for the component carrier in the second UE capability report, or, and both.

In some examples of the method, and apparatuses described herein, the identified carrier aggregation configuration may include operations, features, means, or instructions for identifying a first value for a physical layer capability associated with the first component carrier, identifying a second value for the physical layer capability associated with the first component carrier, and determining that the first value may be greater than the second value, where the UE communicates with the base station using the first value based on determining that the first value may be greater than the second value.

In some examples of the method, and apparatuses described herein, the at least one capability includes a synchronization signal block for beam measurement capability, or a channel state information (CSI) reference signal for beam measurement capability, or a beam failure report capability, or a CSI reference signal for CSI report capability, or a CSI reference signal for CSI interference measurement capability, or a CSI processing unit, or a combination thereof In some examples of the method, and apparatuses described herein, at least one capability of the first set of physical layer capabilities and the second set of physical layer capabilities includes a modified power reduction, or a power class, or a maximum uplink duty cycle, or a multiple-input multiple-output parameter per band, or a bandwidth part feature, or a combination thereof.

In some examples of the method, and apparatuses described herein, a first value of at least one capability in the first set of physical layer capabilities different than a second value of the at least one capability in the second set of physical layer capabilities.

In some examples of the method, and apparatuses described herein, transmitting the first UE capability report may include operations, features, means, or instructions for transmitting the first UE capability report in radio resource control signaling, and transmitting the second UE capability report may include operations, features, means, or instructions for transmitting the second UE capability report in radio resource control signaling.

A method of wireless communication at a base station is described. The method may include receiving, from a UE, a first UE capability report indicating a first channel bandwidth supported by the UE in a radio frequency spectrum band, the first UE capability report including a first set of physical layer capabilities associated with the first channel bandwidth, receiving, from the UE, a second UE capability report indicating a second channel bandwidth supported by the UE in the radio frequency spectrum band, the second UE capability report including a second set of physical layer capabilities associated with the second channel bandwidth, identifying a channel bandwidth to use to communicate with the UE, the identified channel bandwidth including one of the first channel bandwidth or the second channel bandwidth, determining, based on the identified channel bandwidth, configuration information for the UE according to the first set of physical layer capabilities or the second set of physical layer capabilities, and transmitting the determined configuration information to the UE.

An apparatus for wireless communication at a base station is described. The apparatus may include a processor, memory coupled with the processor, and instructions stored in the memory. The instructions may be executable by the processor to cause the apparatus to receive, from a UE, a first UE capability report indicating a first channel bandwidth supported by the UE in a radio frequency spectrum band, the first UE capability report including a first set of physical layer capabilities associated with the first channel bandwidth, receive, from the UE, a second UE capability report indicating a second channel bandwidth supported by the UE in the radio frequency spectrum band, the second UE capability report including a second set of physical layer capabilities associated with the second channel bandwidth, identify a channel bandwidth to use to communicate with the UE, the identified channel bandwidth including one of the first channel bandwidth or the second channel bandwidth, determine, based on the identified channel bandwidth, configuration information for the UE according to the first set of physical layer capabilities or the second set of physical layer capabilities, and transmit the determined configuration information to the UE.

In some examples of the method, and apparatuses described herein, determining the configuration information for the UE may include operations, features, means, or instructions for identifying a carrier aggregation configuration for the UE, and determining, based on the identified channel bandwidth and the carrier aggregation configuration, configuration information for the UE according to the first set of physical layer capabilities or the second set of physical layer capabilities.

In some examples of the method, and apparatuses described herein, determining the configuration information for the UE may include operations, features, means, or instructions for identifying a carrier aggregation configuration for the UE, identifying repeated capability information for the component carrier in the first UE capability report, or the second UE capability report, or both, and determining the configuration information for the UE based on the repeated capability information.

In some examples of the method, and apparatuses described herein, the identified carrier aggregation configuration may include operations, features, means, or instructions for identifying a first value for a physical layer capability associated with the first component carrier, identifying a second value for the physical layer capability associated with the first component carrier, and determining that the first value may be greater than the second value, where the configuration for the UE may be determined using the first value based on determining that the first value may be greater than the second value.

In some examples of the method, and apparatuses described herein, the at least one capability includes a synchronization signal block for beam measurement capability, or a CSI reference signal for beam measurement capability, or a beam failure report capability, or a CSI reference signal for CSI report capability, or a CSI reference signal for CSI interference measurement capability, or a CSI processing unit, or a combination thereof Some examples of the method, and apparatuses described herein may further include operations, features, means, or instructions for determining a combined UE capability report based on the received first UE capability report and the received second UE capability report.

In some examples of the method, and apparatuses described herein, the first UE capability report includes an indication of the radio frequency spectrum band associated with the first channel bandwidth, and the second UE capability report includes the indication of the radio frequency spectrum band associated with the second channel bandwidth.

In some examples of the method, and apparatuses described herein, the indication of the radio frequency spectrum band includes a same band number associated with the first channel bandwidth and the second channel bandwidth.

In some examples of the method, and apparatuses described herein, a first value of at least one capability in the first set of physical layer capabilities may be different than a second value of the at least one capability in the second set of physical layer capabilities.

In some examples of the method, and apparatuses described herein, the at least one capability includes a modified power reduction, or a power class, or a maximum uplink duty cycle, or a multiple-input multiple-output parameter per band, or a bandwidth part feature, or a combination thereof.

Some examples of the method, and apparatuses described herein may further include operations, features, means, or instructions for receiving the first UE capability report includes receiving the first UE capability report in radio resource control signaling, and receiving the second UE capability report includes receiving the second UE capability report in radio resource control signaling.

DETAILED DESCRIPTION

Figure 1:
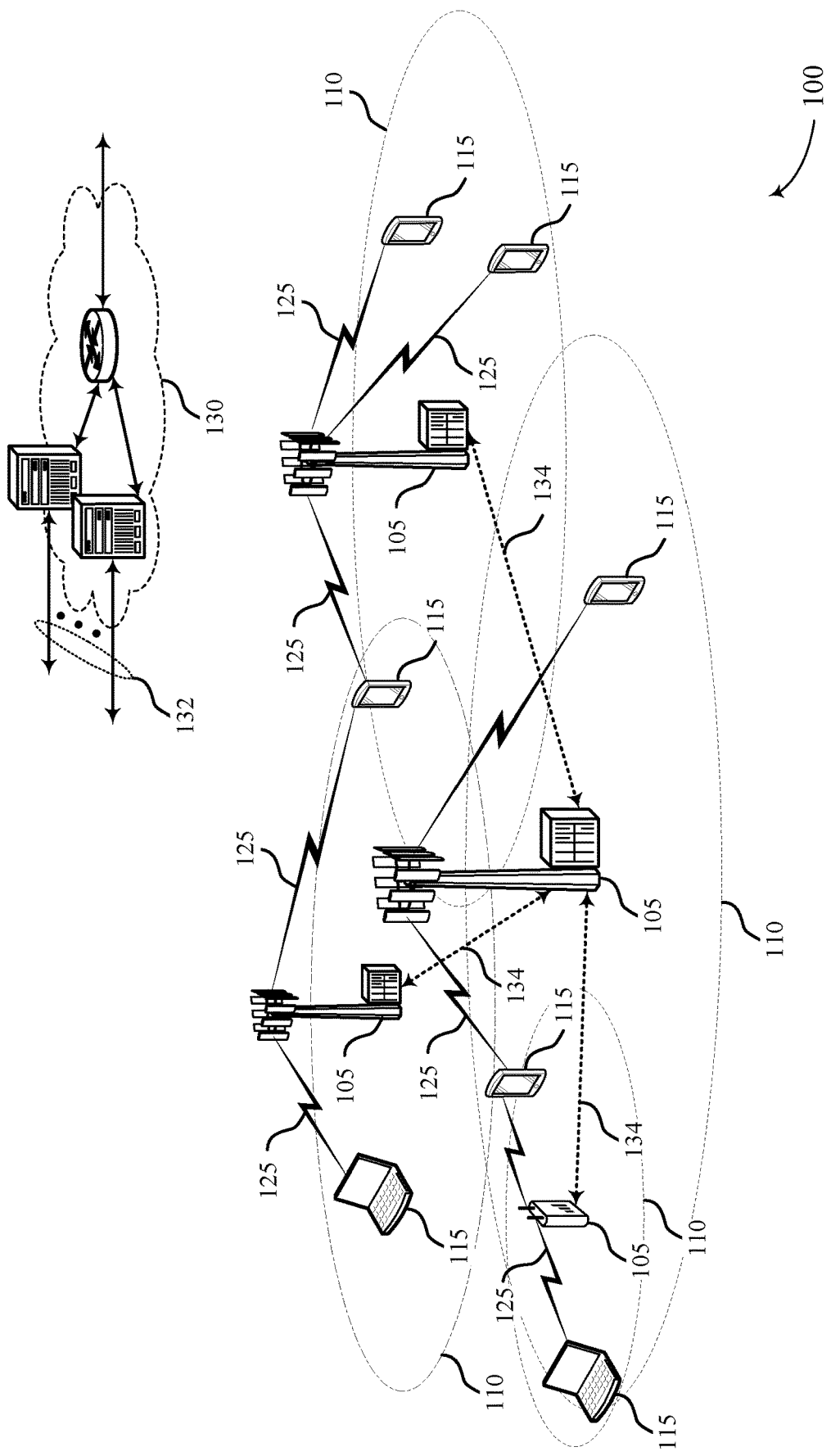
FIG. 1 illustrates an example of a system for wireless communications that supports channel-bandwidth-attributed per-band user equipment capability reporting in accordance with aspects of the present disclosure.

In some wireless communications systems, a user equipment (UE) may receive a transmission such as a UE capability enquiry from the base station or the network. In response to receiving the capability enquiry from the base station or network, the UE may transmit a UE capability report to the base station. The UE capability report may indicate to the base station, the details of the UE capabilities so that the base station may avoid requesting or configuring the UE with a capability which may not be supported by the UE. For different channel bandwidths, the UE may have different physical layer capabilities. In conventional UE capability reporting, the network and/or base station may be constrained to a selected set of restricted bandwidths based on the narrowest set of physical layer capabilities of the UE. Thus, greater flexibility in determining the UE capability may be desired.

In some examples, the UE capability enquiry may be a network request for the UE to send the UE capability information to the base station via a UE capability report. The UE may transmit the UE capability report to the base station and may include a field (e.g., a "supportedBandListNR" field) which may include up to 1024 entries of per-band features, which may be referred to as or identified by frequency band numbers from 1 to 1024. The group of the per-band features may be referred to as "BandNR" which will be discussed in further detail herein. In some examples, the UE may report the UE per-band capability associated with each band number using one entry of BandNR. The UE per-band capability associated with each band number using one entry of BandNR may result in the overly restricted bandwidths previously discussed.

The UE may transmit the physical-layer capability report which may indicate the UE capability for a first band for a first circumstance (e.g., supported 100 MHz, but not 200 MHz). In some examples, the UE capability may be different for the first band for a second circumstance (e.g., supporting 200 MHz), thus the UE may have different capabilities depending on the circumstance or scenario. Because the same band number may be reported more than once for different UE capability information, the second reported UE capability for the first band may overwrite the initially-reported UE capability for the first band, and the initial UE capability may be deleted.

In some examples, UEs may not support or may lack verification of certain channel bandwidths and may report the reduced capability to the base station. Because the UE may not support certain channel bandwidths, one or more bits in a bitmap, which may correspond to the unsupported channel bandwidth, may be punctured. As a result, the UE may report overly conservative and reduced capabilities. In some examples, the UE may have different capabilities for different channel bandwidths, but may report one set of physical layer parameters. As a result, the UE may report the most restrictive capabilities for the supported channel bandwidths, thus resulting in the conservative and reduced capabilities.

Thus, in some examples, determination of the UE capability and corresponding channel bandwidths by the base station may be constrained to an overly restrictive set of bandwidths based on the narrowest received reporting of the UE physical layer capabilities. Accordingly, a method providing greater flexibility in determining the UE capability may be desirable.

In some examples, the channel-bandwidth-attributed per-band UE capability reporting may include determining, for the UE, a first set of physical layer capabilities associated with a first channel bandwidth of a radio frequency spectrum band and a second set of physical layer capabilities associated with a second channel bandwidth of the radio frequency spectrum band, transmitting, to a base station, a first UE capability report indicating the first channel bandwidth and the first UE capability report including the first set of physical layer capabilities, transmitting, to the base station, a second UE capability report indicating the second channel bandwidth and the second UE capability report including the second set of physical layer capabilities, receiving, from the base station, control information indicating a channel bandwidth including the first channel bandwidth or the second channel bandwidth, the control information based on the first set of physical layer capabilities or the second set of physical layer capabilities for the indicated channel bandwidth, and communicating with the base station according to the received control information.

In some examples, the channel-bandwidth-attributed per-band UE capability reporting may include receiving, from a user equipment (UE), a first UE capability report indicating a first channel bandwidth supported by the UE in a radio frequency spectrum band, the first UE capability report including a first set of physical layer capabilities associated with the first channel bandwidth, receiving, from the UE, a second UE capability report indicating a second channel bandwidth supported by the UE in the radio frequency spectrum band, the second UE capability report including a second set of physical layer capabilities associated with the second channel bandwidth, identifying a channel bandwidth to use to communicate with the UE, the identified channel bandwidth including one of the first channel bandwidth or the second channel bandwidth, determining, based on the identified channel bandwidth, configuration information for the UE according to the first set of physical layer capabilities or the second set of physical layer capabilities, and transmitting the determined configuration information to the UE.

Aspects of the disclosure are initially described in the context of a wireless communications system. Example wireless communications systems for channel-bandwidth-attributed per-band UE capability reporting, flow diagrams, and block diagrams for implementing techniques discussed herein are described. Aspects of the disclosure are further illustrated by and described with reference to apparatus diagrams, system diagrams, and flowcharts that relate to channel-bandwidth-attributed per-band user equipment capability reporting.

FIG. 1 illustrates an example of a wireless communications system 100 that supports channel-bandwidth-attributed per-band user equipment capability reporting in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The UE 115 may transmit the UE capability report to the base station which may indicate the UE capability for a first band for a first circumstance. Additionally, the UE capability may be different for the first band for a second circumstance, thus the UE may have different capabilities depending on the circumstance or scenario. In some examples, the UE may have different physical-layer capabilities for different bandwidths and, in some cases, may be constrained based on the most restrictive UE capabilities. In order for UE 115 to have more flexibility in reporting the UE capabilities, the use of a channel bandwidth bitmap may be used as an attribute for the associated collection of per-band physical layer capabilities. Further, the same band number may be used more than one time, thus allowing reporting of distinctive collections of physical layer capabilities.

In some examples, UE 115 may send two separate UE capability reports for two different channel bandwidths to the base station. The base station may select the appropriate channel bandwidth and may transmit control information indicating one of the bandwidths. The UE may then communicate with the base station using the received control information from the base station. In some examples, the same band number may be repeated and the base station may report distinctive collections of UE physical-layer capabilities with disjointed sets of channel bandwidths as the attribute. By implementing the methods described herein, the network may assemble UE BandNR reports repeated for the same band number with greater clarity. This may allow the UE more flexibility in physical-layer capability reporting for larger bandwidths and may prevent overly conservative reporting for smaller bandwidths.

In some examples, for different bandwidths, the UE may have different physical layer capabilities. Because the same band number may be repeated and the UE may report distinctive collections of UE physical-layer capabilities with disjointed sets of channel bandwidths, the UE may be able to more accurately report the UE capabilities, thus resulting in full UE capability reporting to the base station. In some examples, the network may receive disjoint sets of channel bandwidths and may be able to recognize that this was not an erroneous and repetitious transmission and use of the band number. In this case, the network may assemble the disjointed sets of channel bandwidths as opposed to overwriting the initial channel bandwidth. This may allow the network to use the full UE capabilities.

One technique for channel-bandwidth-attributed per-band user equipment capability reporting may include determining, for the UE, a first set of physical layer capabilities associated with a first channel bandwidth of a radio frequency spectrum band and a second set of physical layer capabilities associated with a second channel bandwidth of the radio frequency spectrum band, transmitting, to a base station, a first UE capability report indicating the first channel bandwidth and including the first set of physical layer capabilities, transmitting, to the base station, a second UE capability report indicating the second channel bandwidth and including the second set of physical layer capabilities, receiving, from the base station, control information indicating a channel bandwidth including the first channel bandwidth or the second channel bandwidth, the control information based on the first set of physical layer capabilities or the second set of physical layer capabilities for the indicated channel bandwidth, and communicating with the base station according to the received control information.

This technique for channel-bandwidth-attributed per-band UE capability reporting may further include receiving, from a UE, a first UE capability report indicating a first channel bandwidth supported by the UE in a radio frequency spectrum band, the first UE capability report including a first set of physical layer capabilities associated with the first channel bandwidth, receiving, from the UE, a second UE capability report indicating a second channel bandwidth supported by the UE in the radio frequency spectrum band, the second UE capability report including a second set of physical layer capabilities associated with the second channel bandwidth, identifying a channel bandwidth to use to communicate with the UE, the identified channel bandwidth including one of the first channel bandwidth or the second channel bandwidth, determining, based on the identified channel bandwidth, configuration information for the UE according to the first set of physical layer capabilities or the second set of physical layer capabilities, and transmitting the determined configuration information to the UE.

Figure 2:
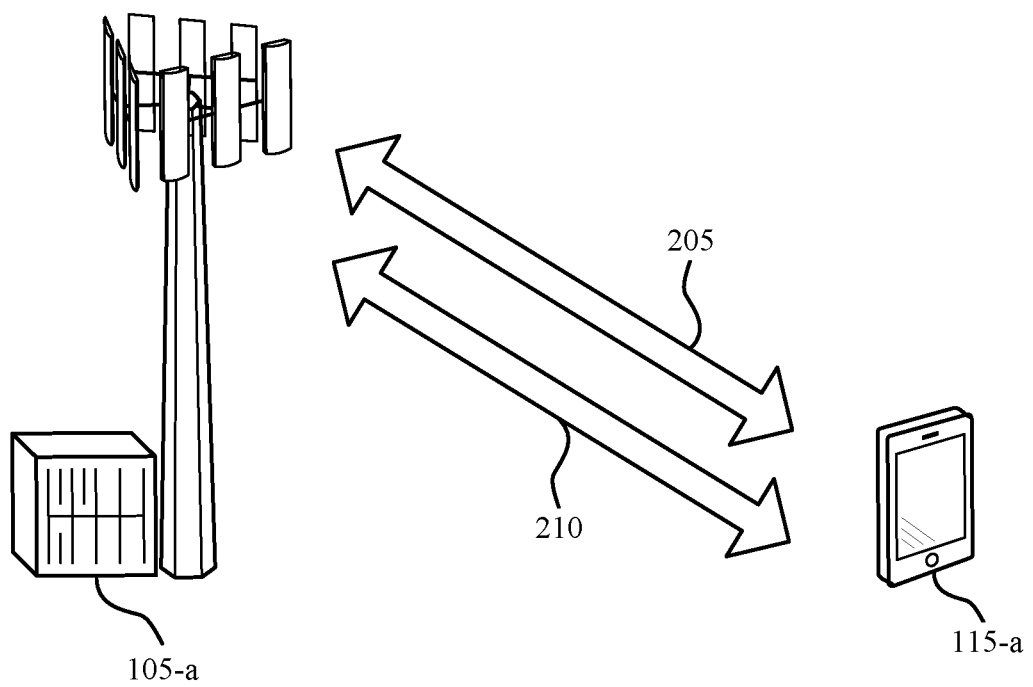
FIG. 2 illustrates an example of a wireless communications system that supports channel-bandwidth-attributed per-band user equipment capability reporting in accordance with aspects of the present disclosure.

FIG. 2 illustrates an example of a wireless communications system 200 that supports channel-bandwidth-attributed per-band user equipment capability reporting in accordance with aspects of the present disclosure. In some examples, wireless communications system 200 may implement aspects of wireless communications system 100. In the example of FIG. 2, the wireless communications system 200 may include a first base station 105-a, which may be an example of a base station 105 of FIG. 1. The wireless communications system 200 may also include a UE 115-a, which may be an example of UE 115 of FIG. 1.

In FIG. 2, a UE 115-a may receive a transmission such as a UE capability enquiry from the base station or the network. The UE capability enquiry may be a network request for the UE 115-a to send the UE capability information to the base station. The UE 115-a may transmit the UE capability information reporting to the base station and, in some examples, the UE 115-a may communicate the UE capability information in an RRC transmission.

As illustrated in FIG. 2, the UE 115-a may transmit a first UE capability report via communication link 205, which may indicate a first channel bandwidth and may additionally transmit a second UE capability report via communication link 210. The first capability report may indicate the first channel bandwidth and may include the first set of physical layer capabilities associated with the first channel bandwidth, and the second capability report may indicate the second channel bandwidth and may include the second set of physical layer capabilities associated with the second channel bandwidth. The base station 105-a may identify which of the first or second channel bandwidth to use in communicating with the UE 115-a. The base station 105-a may determine configuration information for the UE 115-a according to the corresponding first set or second set of physical layer capabilities. The base station 105-a may transmit the configuration information to the UE 115-a. In some examples, the base station 105-a may determine to use the first channel bandwidth in communicating with the UE and may transmit the configuration information via communications link 205. In some examples, the base station 105-a may determine to use the second channel bandwidth in communicating with the UE 115-a and may transmit the configuration information via communications link 210.

The UE capability report transmitted from the UE and received by the base station may include a "supportedBandListNR" field which may include up to 1024 entries of per-band features referred to as "BandNR." Each entry of BandNR may include three main components. The first component of the BandNR entry may be a frequency band number from 1 to 1024. For example, n1 may occupy the frequency bands 1920-1980 MHz for uplink and may occupy the frequency bands 2110-2170 MHz for downlink.

In some examples, there may be a one-to-one mapping of a BandNR entry to one band number. In this case, the UE may indicate the UE per-band capability associated with each band number using one BandNR entry. In some examples, the UE 115-a may not support or may lack verification of certain channel bandwidths, and may puncture corresponding bits in the bitmap of channel bandwidths. In this example, the collection of UE radio capabilities may accommodate all the channel bandwidths that are not punctured in the bitmap over the associated band number, thus resulting in an overly conservative UE physical-layer capability. Additionally, because each band has a single entry available in the list, when the same band has an additional entry, the original entry may be overwritten.

In some examples of one-to-one mapping of a BandNR entry to one band number, a 200 MHz bandwidth may use additional processing power when compared to the processing power used for a 100 MHz bandwidth. Due to the larger breadth of the bandwidth, the measurement capability may drop, thus using additional processing power. In some examples, for 200 MHz bandwidth in a frequency range, FR2, certain per-band UE capabilities such as channel state information-resource signals (CSI-RSs) for beam management may not be sustained as they are under a 100 MHz bandwidth. In some examples, NR frequency bands may be divided into FR1 and FR2. FR1 may include the frequency range from 450 MHz to 6 GHz and FR2 may include the frequency range from 24.25 GHz to 52.6 GHz. In this example, the CSI-RS may be measured and for smaller bandwidths such as 100 MHz or smaller, the system may support 8 resources. If the bandwidth is 200 MHz, the processing power may not be capable of supporting 8 resources and may measure 4 CRS-RS resources since each resource is much wider and more processing power may be used.

In some examples, there may be a mapping of many BandNR entries to one band-number which will be discussed in detail herein. The second component of the BandNR entry may be a collection of UE physical-layer capabilities which may include, but are not limited to, modified power reduction, power class, maximum uplink duty cycle, MIMO parameters per band, bandwidth part feature, and so forth.

The third component of the BandNR entry may be a bitmap of channel bandwidths supported by the UE 115-a, which in some examples, may be intended for different development stages of network interoperability testing.

In some examples, the channel bandwidth bitmap may be used as an attribute for the collection of per-band UE physical layer capabilities and the same band number may be reused more than one time to report distinctive collections of UE physical layer capabilities with disjoint sets of channel bandwidths as the attribute. In some examples, the attribute may be a supported 5 bit channel bandwidth bit map. Disjointed sets of channel bandwidths may refer to two different instances of the value of bits in a bit map. For example, a first instance of a set of channel bandwidths may include 2 bits equal to one and in the second instance, for the same set of channel bandwidths, 3 bits may be equal to one. These two sets of channel bandwidths may be referred to as disjointed sets. In some examples, the first and second instance of sets of channel bandwidths may be assembled into a single capability report.

In some examples, the UE physical layer capabilities may have disjointed sets of channel bandwidths in two different capability reports. In this example, the network may recognize that the sets of channel bandwidths are not repetitious and may assemble the disjointed sets instead of overwriting the old report with the new report.

Figure 3:
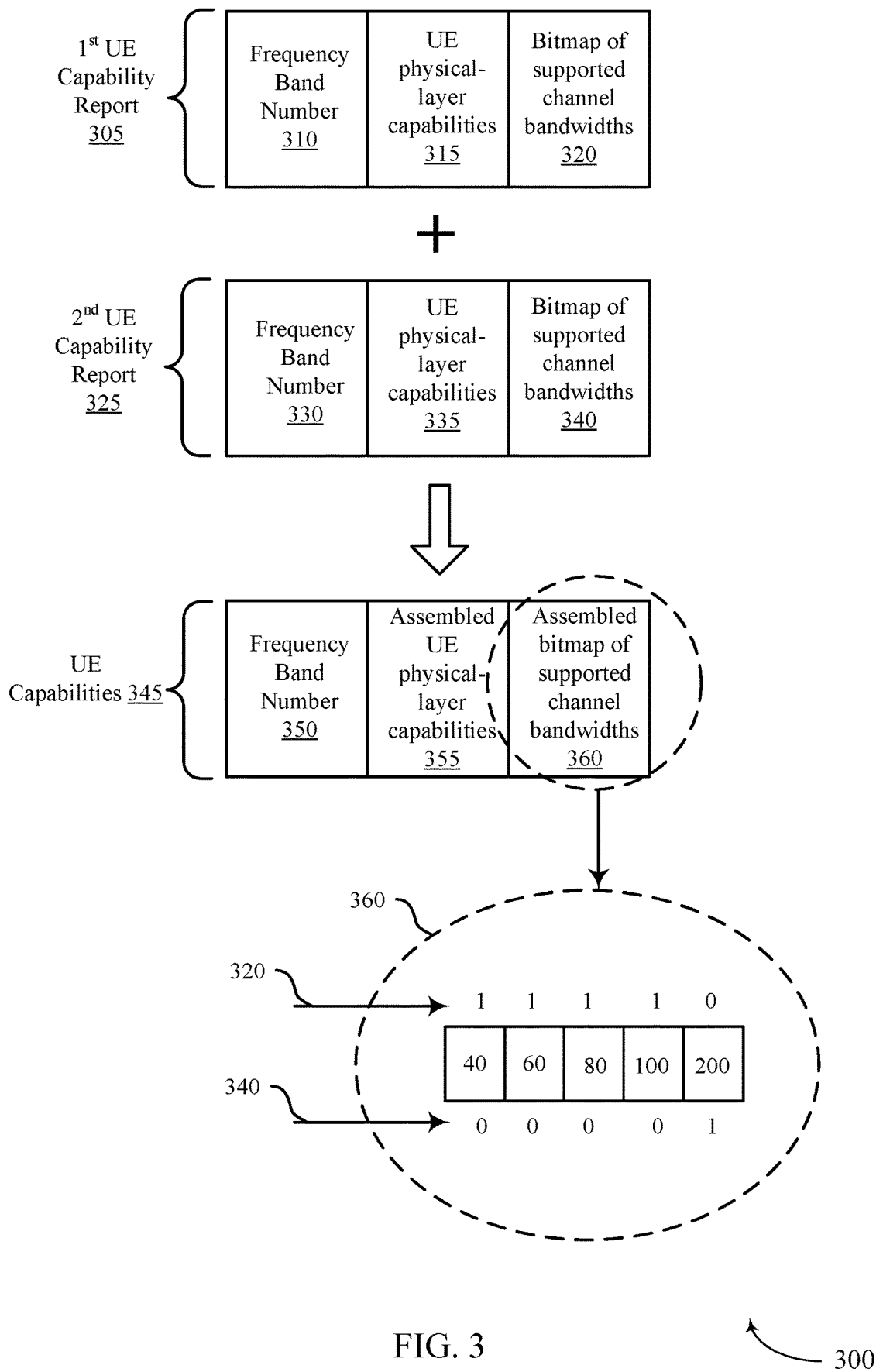
FIG. 3 illustrates an example of a block diagram that supports channel-bandwidth-attributed per-band user equipment capability reporting in accordance with aspects of the present disclosure.

FIG. 3 illustrates an example of a block diagram 300 that supports channel-bandwidth-attributed per-band user equipment capability reporting in accordance with aspects of the present disclosure. In some examples, block diagram 300 may implement aspects of wireless communications system 100. In the example of FIG. 3, the block diagram 300 may include a first UE capability report 305 and a second UE capability report 325. The capability reporting may be for a UE 115-a, which may be an example of UE 115 of FIG. 1.

In FIG. 3, the first UE capability report 305 may include the BandNR, per-band features and as previous described, each entry of BandNR may include three main components. In FIG. 3, the first UE capability report 305 may include the frequency band number 310, the UE physical-layer capabilities 315, and the bitmap 320 of supported channel bandwidths. Similarly, the second UE capability report 325 may include the frequency band number 330, the UE physical-layer capabilities 335, and the bitmap 340 of supported channel bandwidths.

As depicted in FIG. 3, the first UE capability report 305 and second UE capability report 325 may be combined into the UE, which may also result in the 40 MHz, 60 MHz, and 80 MHz channel bandwidths being supported as well. Further, the bitmap 320 may indicate that the 200 MHz channel bandwidth may not be supported by the UE with the value zero. Additionally, the bitmap 340 may indicate, with the value zero, that the 40 MHz, 60 MHz, 80 MHz and 100 MHz channel bandwidths may not be supported by the UE. In another example, the bitmap 320 may indicate, with the value one, that the 200 MHz channel bandwidth may be supported by the UE. Accordingly, the assembled bitmap 360 may support all of the 40 MHz, 60 MHz, 80 MHz, 100 MHz, and 200 MHz channel bandwidths.

In some examples, the per-band UE capabilities may include a condition "across all CCs" (e.g., a synchronization signal block for beam measurement capability, or a CSI-RS for beam measurement capability, or a beam failure report capability, or a CSI-RS for CSI report capability, or a CSI-RS for CSI reporting, or a CSI interference measurement for CSI reporting, or a CSI processing unit, and so forth, or any combination thereof). In some examples, this "across all CCs" condition may be interpreted as across all CCs under carrier aggregation. The table illustrates the "across all CCs" condition below:

Feature Group Indicator (FGI) MeasurementResource List

| 2-24 | SSB/CSI-RS for beam measurement | 1. The max number of SSB/CSI-RS (1Tx) resources (sum of aperiodic/periodic/semi-persistent) across all CCs configured to measure L1-RSRP within a slot shall not exceed $M_{B\_1}$<br>1a. The max number of CSI-RS resources (sum of aperiodic/periodic/semi-persistent) across all CCs configured to measure L1-RSRP shall not exceed $M_{C\_1}$<br>2. The max number of CSI-RS (2Tx) resources (sum of aperiodic/periodic/semi-persistent) across all CCs to measure L1-RSRP within a slot shall not exceed $M_{B\_2}$<br>4. The max number of aperiodic CSI-RS resources across all CCs configured to measure L1-RSRP shall not exceed $M_{D\_1}$ |
|---|---|---|
| 2-31 | Beam failure recovery | 1. Maximal number of CSI-RS resources across all CCs for UE to monitor PDCCH quality<br>2. Maximal number of different SSBs across all CCs for UE to monitor PDCCH quality<br>3. Maximal number of different CSI-RS [and/or SSB] resources across all CCs for new beam identifications |
| 2-33 | CSI-RS and CSI-IM reception for CSI feedback | 1. Supported max # of configured NZP-CSI-RS resources per CC.<br>2. Supported max # of ports across all configured NZP-CSI-RS resources per CC<br>3. Supported max # of configured CSI-IM resources per CC<br>4. Supported max # simultaneous NZP CSI-RS resources in active BWPs across all CCs<br>4a. Supported max # simultaneous NZP-CSI-RS resources per CC<br>5. Supported max total # of CSI-RS ports in simultaneous NZP CSI-RS resources in active BWPs across all CCs<br>5a. Supported max total # of CSI-RS ports in simultaneous NZP-CSI-RS resources per CC |
| 2-35 | CSI report framework | 5. UE can process X CSI report(s) simultaneously across all CCs. CSI reports can be P/SP/A CSI and any latency class and codebook type. | the assembled UE capability report 345. The assembled UE capability report may also include the frequency band number 350, the UE physical-layer capabilities 355, and the assembled bitmap 360 of supported channel bandwidths.

The assembled bitmap 360 of supported channel bandwidths is enlarged and illustrated in greater detail in FIG. 3. In some examples, the assembled bitmap 360 may include the assembly or combination of the bitmap 320 of supported channel bandwidths and the bitmap 340 of supported channel bandwidths. The bitmap 320 may indicate, with a value one, that the 40 MHz, 60 MHz, 80 MHz, and 100 MHz channel bandwidths may be supported by the UE. In another example, the bitmap 320 may indicate, with the value one, that the 100 MHz channel bandwidth may be supported by In the example of inter-band carrier aggregation (e.g., different frequency bands), although UE capabilities may be repeated in each BandNR, they may not be aggregated by the number of bands. For example, the carrier aggregation configuration may include multiple component carriers. The first set of physical layer capabilities may include repeating, for each component carrier, capability information for the component carrier in the first UE capability report, or the second set of physical layer capabilities may include may include repeating, for each component carrier, capability information for the component carrier in the second UE capability report, but the UE capabilities may not be aggregated by the number of bands.

In the example of inter-frequency range carrier aggregation (e.g., different frequency ranges), the higher of the FR1 and FR2 may be used as the total capability, as the lower number may not be exceeded in its corresponding frequency range. In some examples, NR frequency bands may be divided into FR1 and FR2. FR1 may include the frequency range from 450 MHz to 6 GHz and FR2 may include the frequency range from 24.25 GHz to 52.6 GHz. Further, the frequency range corresponding to the higher number may assume the remaining capability. In some examples, the carrier aggregation configuration may be identified and may be associated with either the first or the second channel bandwidth.

In some examples, for the FR2 bands that may use the 200 MHz bandwidth, the UE may report the same band number twice. In one example, the band number n257 may appear a first time and may list a first set of higher FGI 2-24 values "beamManagementSSB-CSI-RS" values. Additionally, the band number n257 may use "channelBWs-DL-v1530" to indicate the BW up to 100 MHz. For example:

```
BeamManagementSSB-CSI-RS::= SEQUENCE {
  maxNumberSSB-CSI-RS-ResourceOneTx {n8},
  maxNumberCSI-RS-Resource {n32},
  maxNumberCSI-RS-ResourceTwoTx {n0},
  supportedCSI-RS-Density {oneAndThree}
  maxNumberAperiodicCSI-RS-Resource {n16}
}
```

The band number n257 may appear a second time and may list a second set of lower FGI 2-24 values. Further, the band number n256 may use "channelBWs-DL-v1530" to indicate the BW of 200 MHz. For example:

```
BeamManagementSSB-CSI-RS::= SEQUENCE {
  maxNumberSSB-CSI-RS-ResourceOneTx {TBD},
  maxNumberCSI-RS-Resource {TBD},
  maxNumberCSI-RS-ResourceTwoTx {n0},
  supportedCSI-RS-Density {oneAndThree}
  maxNumberAperiodicCSI-RS-Resource {TBD}
}
```

On the network or base station side, this may use an extra bandwidth index in addition to the FR2 band number such that the BandNR data structure may be correctly referenced.

Figure 4:
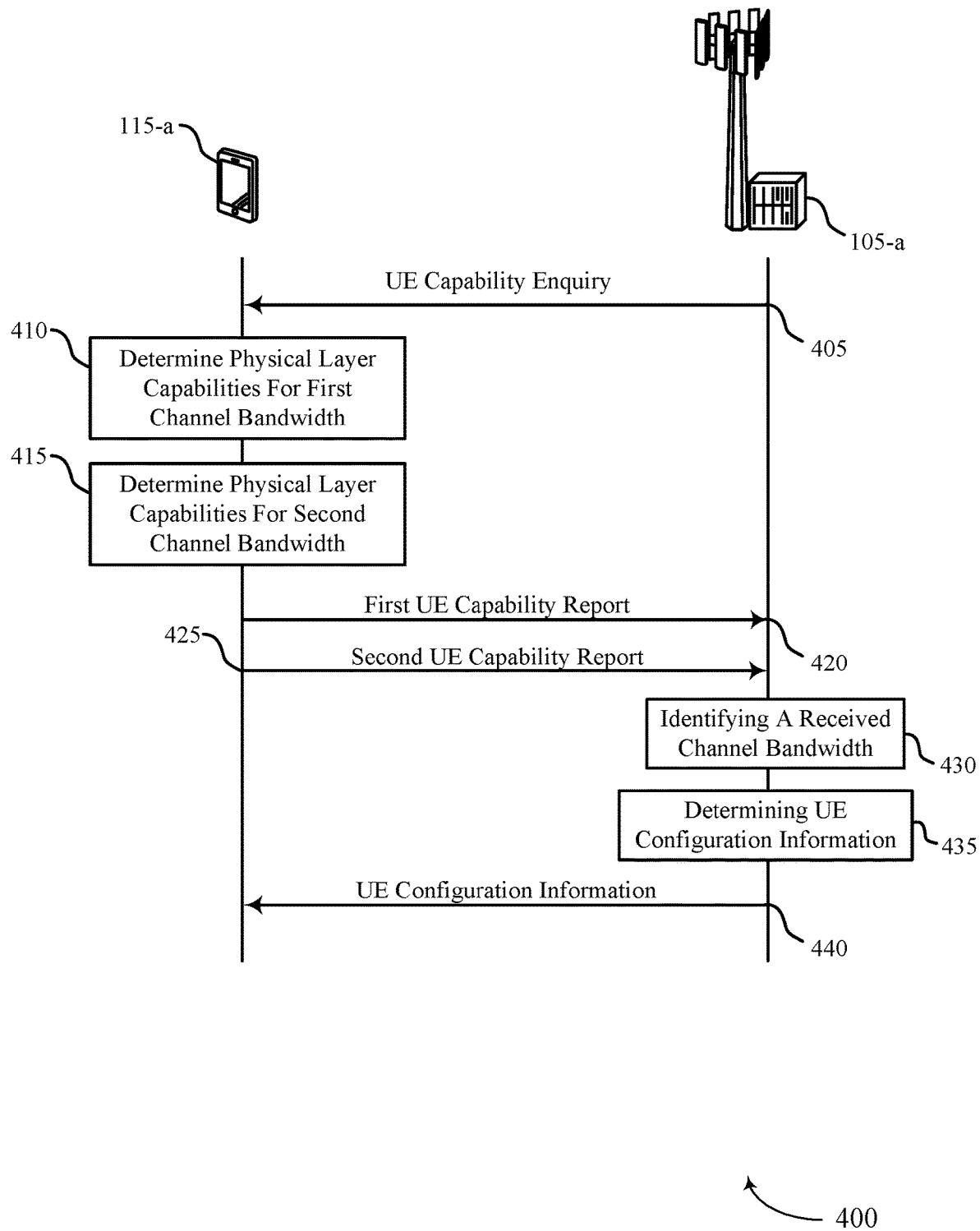
FIG. 4 illustrates an example of a flow diagram that supports channel-bandwidth-attributed per-band user equipment capability reporting in accordance with aspects of the present disclosure.

FIG. 4 illustrates an example of a process flow 400 that supports channel-bandwidth-attributed per-band user equipment capability reporting in accordance with aspects of the present disclosure. In some examples, process flow 400 may implement aspects of wireless communications system 100. In the example of FIG. 4, the process flow 400 may include a base station 105-a, which may be an example of a base station 105 of FIG. 1. The process flow 400 may also include a UE 115-a, which may be an example of UE 115 of FIG. 1. Additionally, in the example of FIG. 4, the process flow 400 may include one example of a UE transmitting capability reports to a base station, which may be an example of the transmitted capability reports as discussed in FIGS. 2 and 3.

At 405, base station 105-a may transmit, to UE 115-a, a UE capability enquiry. The UE 115-a may receive the transmitted UE capability enquiry. The capability enquiry may be requested according to a communication protocol. The UE capability may be requested so that the base station 105-a may avoid requesting or configuring the UE 115-a to use a capability which may not be supported by the UE 115-a. The UE capability enquiry may be communicated via an RRC message to the base station 105-a.

At 410, UE 115-a may determine a first set of UE physical layer capabilities for a first channel bandwidth. The first set of UE physical layer capabilities may be associated with a first channel bandwidth. Similarly, at 415, UE 115-a may determine a second set of UE physical layer capabilities for a second channel bandwidth and the second set of UE physical layer capabilities may be associated with a second channel bandwidth.

At 420, UE 115-a may transmit a first UE capability report to base station 105-a and at 425, UE 115-a may transmit a second UE capability report to base station 105-a. Base station 105-a may receive the transmitted first and second UE capability reports from UE 115-a. The UE capability reports may include a supportedBandListNR field which may include up to 1024 entries of per-band features referred to as BandNR as described with reference to FIGS. 2 and 3.

At 430, base station 105-a may identify a received channel bandwidth from the two different received channel bandwidths of the UE capability reports. The identified channel bandwidth may be used to communicate with the UE and may include one of the first channel bandwidth or the second channel bandwidth.

At 435, base station 105-a may determine UE configuration information. The configuration information for the UE may correspond to the first or the second set of physical layer capabilities received in the first or second UE capability reports.

At 440, base station 105-a may transmit the determined UE configuration information to UE 115-a and UE 115-a may receive the transmitted UE configuration information from base station 105-a. The received configuration information may include control information indicating a channel bandwidth which may include the first or second channel bandwidth. Additionally, UE 115-a may communicate with base station 105-a according to the received control information.

Figure 5:
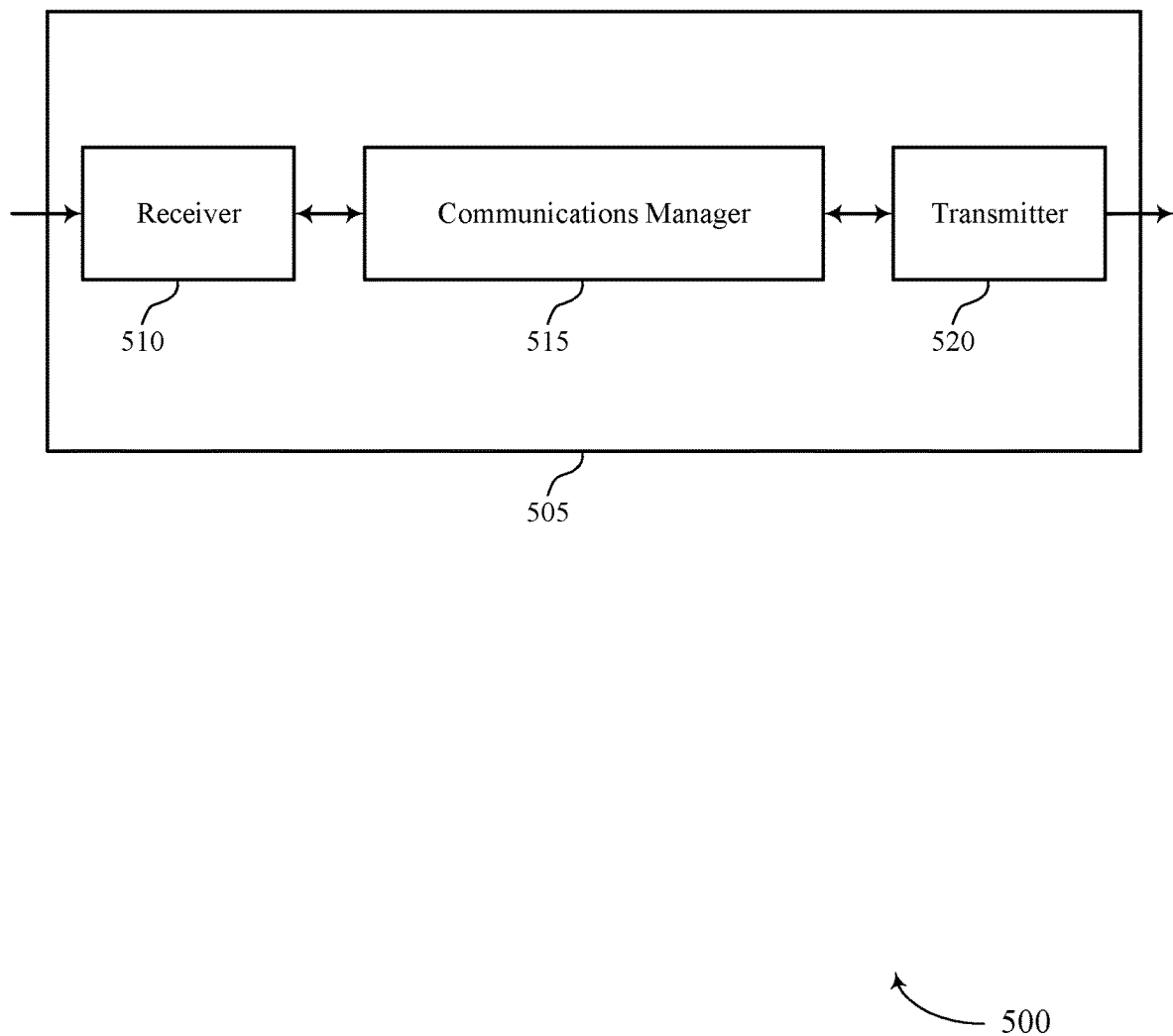
FIGS. 5 and 6 show block diagrams of devices that support channel-bandwidth-attributed per-band user equipment capability reporting in accordance with aspects of the present disclosure.

FIG. 5 shows a block diagram 500 of a device 505 that supports channel-bandwidth-attributed per-band user equipment capability reporting in accordance with aspects of the present disclosure. The device 505 may be an example of aspects of a UE 115 as described herein. The device 505 may include a receiver 510, a communications manager 515, and a transmitter 520. The device 505 may also include one or more processors, memory coupled with the one or more processors, and instructions stored in the memory that are executable by the one or more processors to enable the one or more processors to perform the channel-bandwidth-attributed per-band user equipment capability reporting features discussed herein. Each of these components may be in communication with one another (e.g., via one or more buses).

The receiver 510 may receive information such as packets, user data, or control information associated with various information channels (e.g., control channels, data channels, and information related to channel-bandwidth-attributed per-band user equipment capability reporting, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may determine, for the UE, a first set of physical layer capabilities associated with a first channel bandwidth of a radio frequency spectrum band and a second set of physical layer capabilities associated with a second channel bandwidth of the radio frequency spectrum band. The communications manager 515 may transmit, to a base station, a first UE capability report indicating the first channel bandwidth and including the first set of physical layer capabilities, and may transmit, to the base station, a second UE capability report indicating the second channel bandwidth and including the second set of physical layer capabilities. The communications manager 515 may receive, from the base station, control information indicating a channel bandwidth including the first channel bandwidth or the second channel bandwidth, and may communicate with the base station using the first set of physical layer capabilities or the second set of physical layer capabilities based on the indicated channel bandwidth. The communications manager 515 may be an example of aspects of the communications manager 810 described herein. The actions performed by the communications manager 515 as described herein may be implemented to realize one or more potential advantages. One implementation may allow a UE to save resources and increase spectral efficiency by avoiding a narrowest set of physical layer capabilities of the UE by transmitting the capability reports to the base station including the physical layer capabilities and indicating the channel bandwidths. Another implementation may provide improved quality and reliability of service at the UE, as latency may be reduced.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
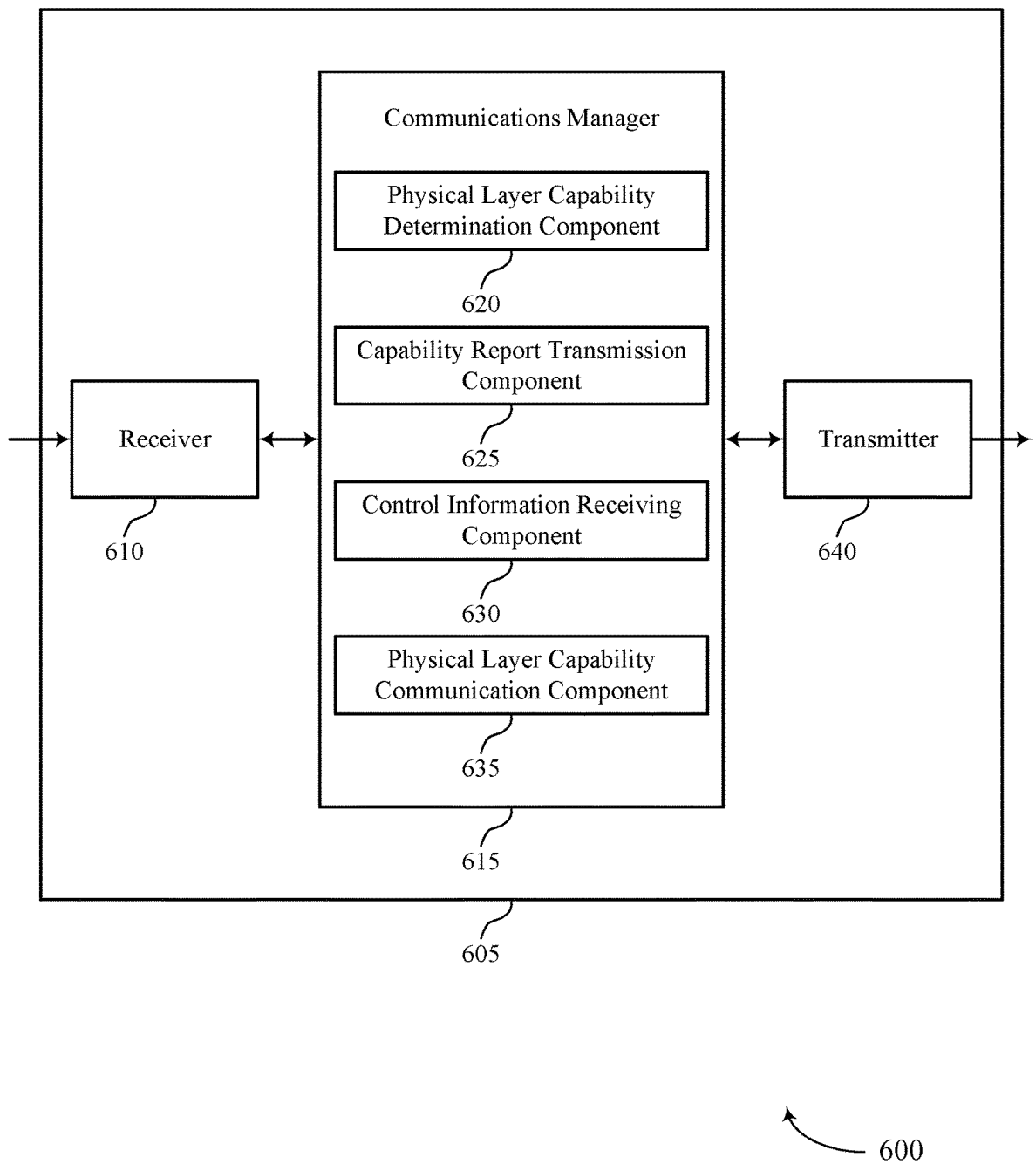

FIG. 6 shows a block diagram 600 of a device 605 that supports channel-bandwidth-attributed per-band user equipment capability reporting in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to channel-bandwidth-attributed per-band user equipment capability reporting, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a physical layer capability determination component 620, a capability report transmission component 625, a control information receiving component 630, and a physical layer capability communication component 635. The communications manager 615 may be an example of aspects of the communications manager 810 described herein.

The physical layer capability determination component 620 may determine, for the UE, a first set of physical layer capabilities associated with a first channel bandwidth of a radio frequency spectrum band and a second set of physical layer capabilities associated with a second channel bandwidth of the radio frequency spectrum band. Based on determining the physical layer capabilities, a processor of the UE (e.g., controlling the receiver 610, the transmitter 640, or the transceiver 820 as described with reference to FIG. 8) may efficiently identify a carrier aggregation configuration associated with the first bandwidth or the second bandwidth. Further, the processor of UE may transmit the UE capability reports. The processor of the UE may turn on one or more processing units for transmitting the UE capability reports, increase a processing clock, or a similar mechanism within the base station. As such, when the UE capability reports are transmitted, the processor may be ready to respond more efficiently through the reduction of a ramp up in processing power The capability report transmission component 625 may transmit, to a base station, a first UE capability report indicating the first channel bandwidth and including the first set of physical layer capabilities and transmit, to the base station, a second UE capability report indicating the second channel bandwidth and including the second set of physical layer capabilities.

The control information receiving component 630 may receive, from the base station, control information indicating a channel bandwidth including the first channel bandwidth or the second channel bandwidth.

The physical layer capability communication component 635 may communicate with the base station using the first set of physical layer capabilities or the second set of physical layer capabilities based on the indicated channel bandwidth.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

In some cases, the physical layer capability determination component 620, the capability report transmission component 625, the control information receiving component 630, and the physical layer capability communication component 635 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the physical layer capability determination component 620, the capability report transmission component 625, the control information receiving component 630, and the physical layer capability communication component 635 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
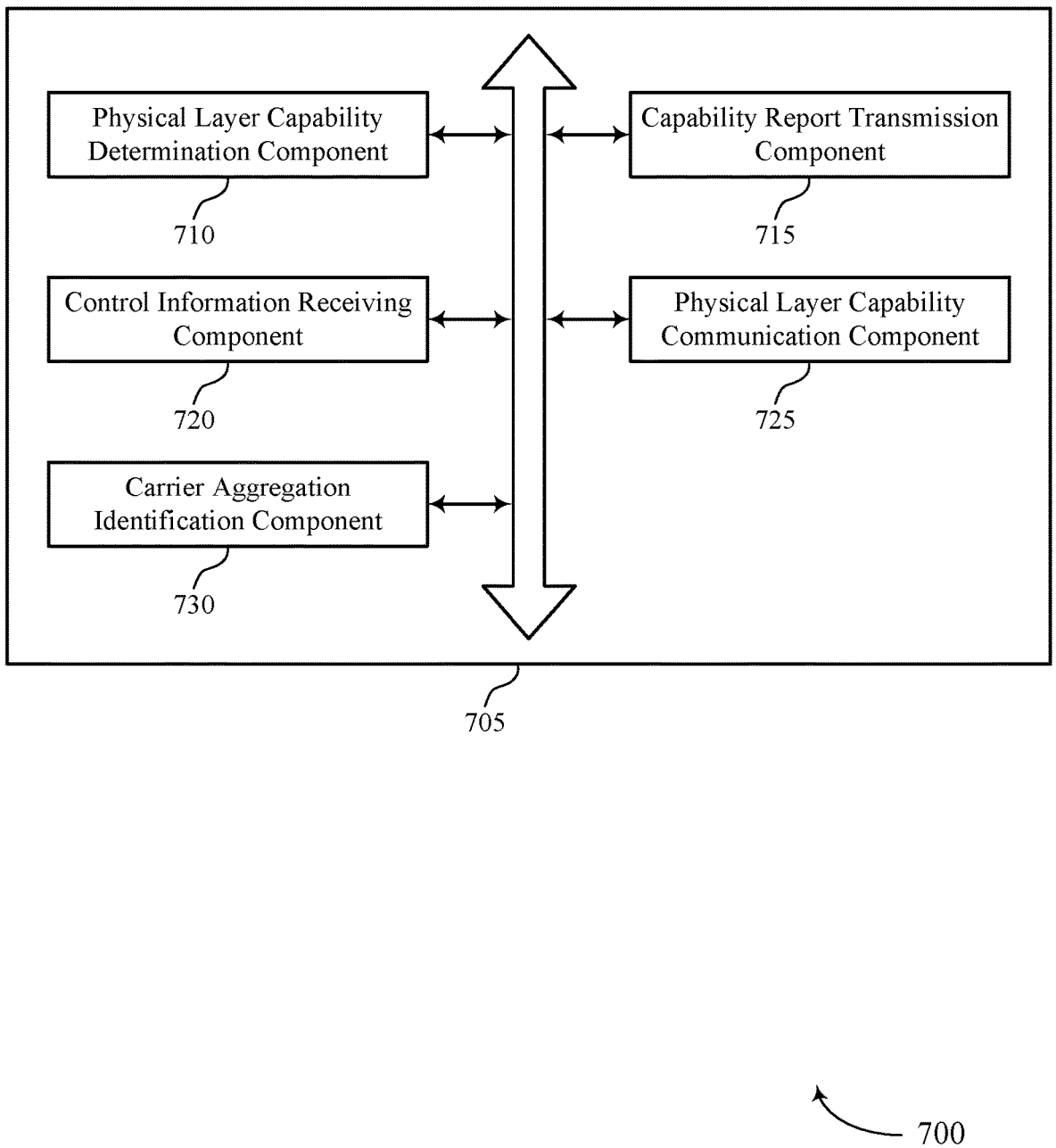
FIG. 7 shows a block diagram of a communications manager that supports channel-bandwidth-attributed per-band user equipment capability reporting in accordance with aspects of the present disclosure.

FIG. 7 shows a block diagram 700 of a communications manager 705 that supports channel-bandwidth-attributed per-band user equipment capability reporting in accordance with aspects of the present disclosure. The communications manager 705 may be an example of aspects of a communications manager 515, a communications manager 615, or a communications manager 810 described herein. The communications manager 705 may include a physical layer capability determination component 710, a capability report transmission component 715, a control information receiving component 720, a physical layer capability communication component 725, and a carrier aggregation identification component 730. Each of these modules may communicate, directly or indirectly, with one another (e.g., via one or more buses).

The physical layer capability determination component 710 may determine, for the UE, a first set of physical layer capabilities associated with a first channel bandwidth of a radio frequency spectrum band and a second set of physical layer capabilities associated with a second channel bandwidth of the radio frequency spectrum band. In some examples, the physical layer capability determination component 710 may determine at least one physical layer capability of the first set of physical layer capabilities or the second set of physical layer capabilities based on the identified carrier aggregation configuration.

The capability report transmission component 715 may transmit, to a base station, a first UE capability report indicating the first channel bandwidth and including the first set of physical layer capabilities. In some examples, the capability report transmission component 715 may transmit, to the base station, a second UE capability report indicating the second channel bandwidth and including the second set of physical layer capabilities.

The control information receiving component 720 may receive, from the base station, control information indicating a channel bandwidth including the first channel bandwidth or the second channel bandwidth.

The physical layer capability communication component 725 may communicate with the base station using the first set of physical layer capabilities or the second set of physical layer capabilities based on the indicated channel bandwidth.

The carrier aggregation identification component 730 may identify a carrier aggregation configuration associated with at least one of the first channel bandwidth or the second channel bandwidth.

In some cases, the physical layer capability determination component 710, the capability report transmission component 715, the control information receiving component 720, the physical layer capability communication component 725, and the carrier aggregation identification component 730 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features discussed herein with reference to the physical layer capability determination component 710, the capability report transmission component 715, the control information receiving component 720, the physical layer capability communication component 725, and the carrier aggregation identification component 730.

Figure 8:
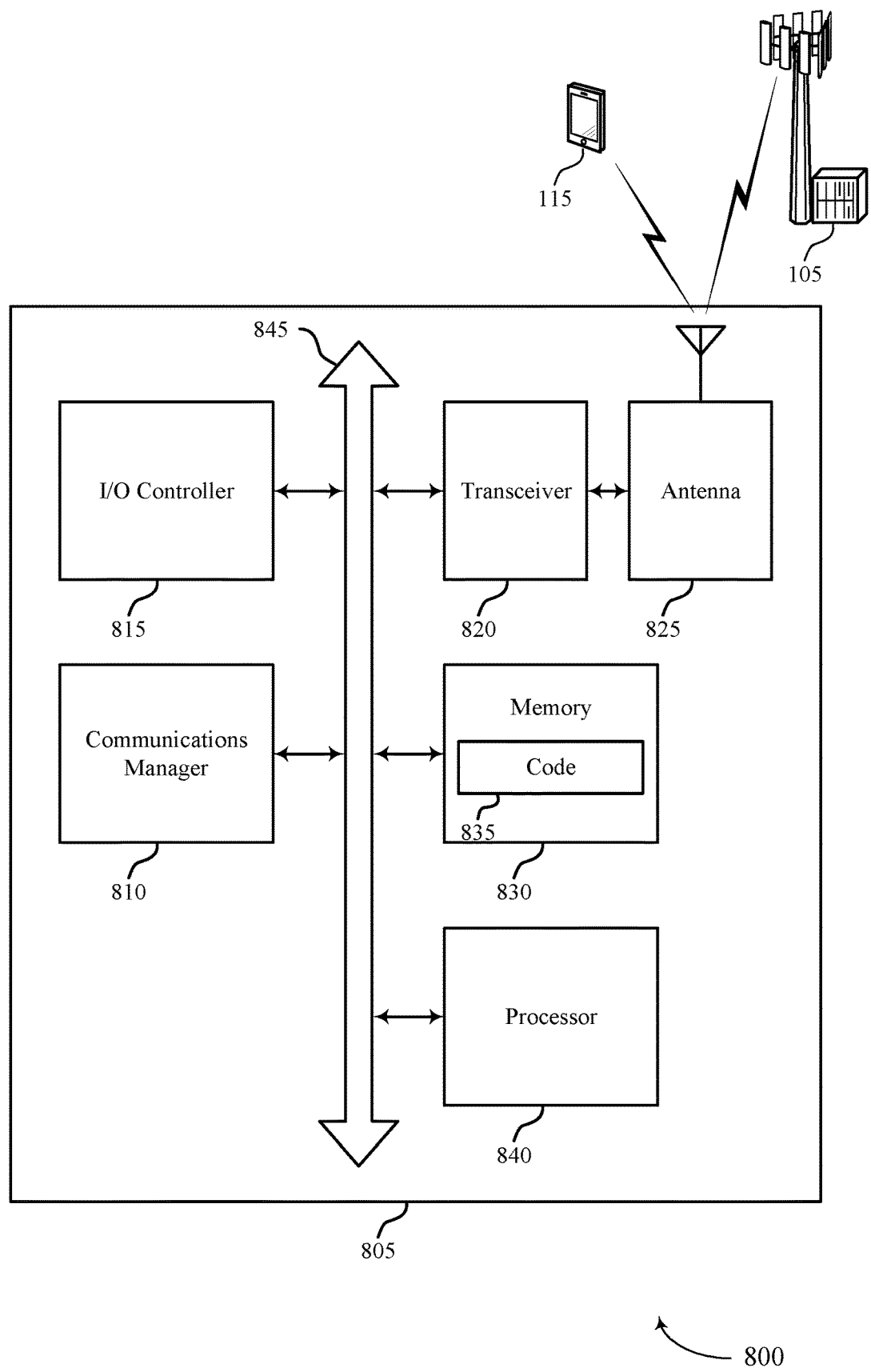
FIG. 8 shows a diagram of a system including a device that supports channel-bandwidth-attributed per-band user equipment capability reporting in accordance with aspects of the present disclosure.

FIG. 8 shows a diagram of a system 800 including a device 805 that supports channel-bandwidth-attributed per-band user equipment capability reporting in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine, for the UE, a first set of physical layer capabilities associated with a first channel bandwidth of a radio frequency spectrum band and a second set of physical layer capabilities associated with a second channel bandwidth of the radio frequency spectrum band. The communications manager 810 may transmit, to a base station, a first UE capability report indicating the first channel bandwidth and including the first set of physical layer capabilities, and may transmit, to the base station, a second UE capability report indicating the second channel bandwidth and including the second set of physical layer capabilities. The communications manager 810 may receive, from the base station, control information indicating a channel bandwidth including the first channel bandwidth or the second channel bandwidth, and may communicate with the base station using the first set of physical layer capabilities or the second set of physical layer capabilities based on the indicated channel bandwidth.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases, the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/basic output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting channel-bandwidth-attributed per-band user equipment capability reporting).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
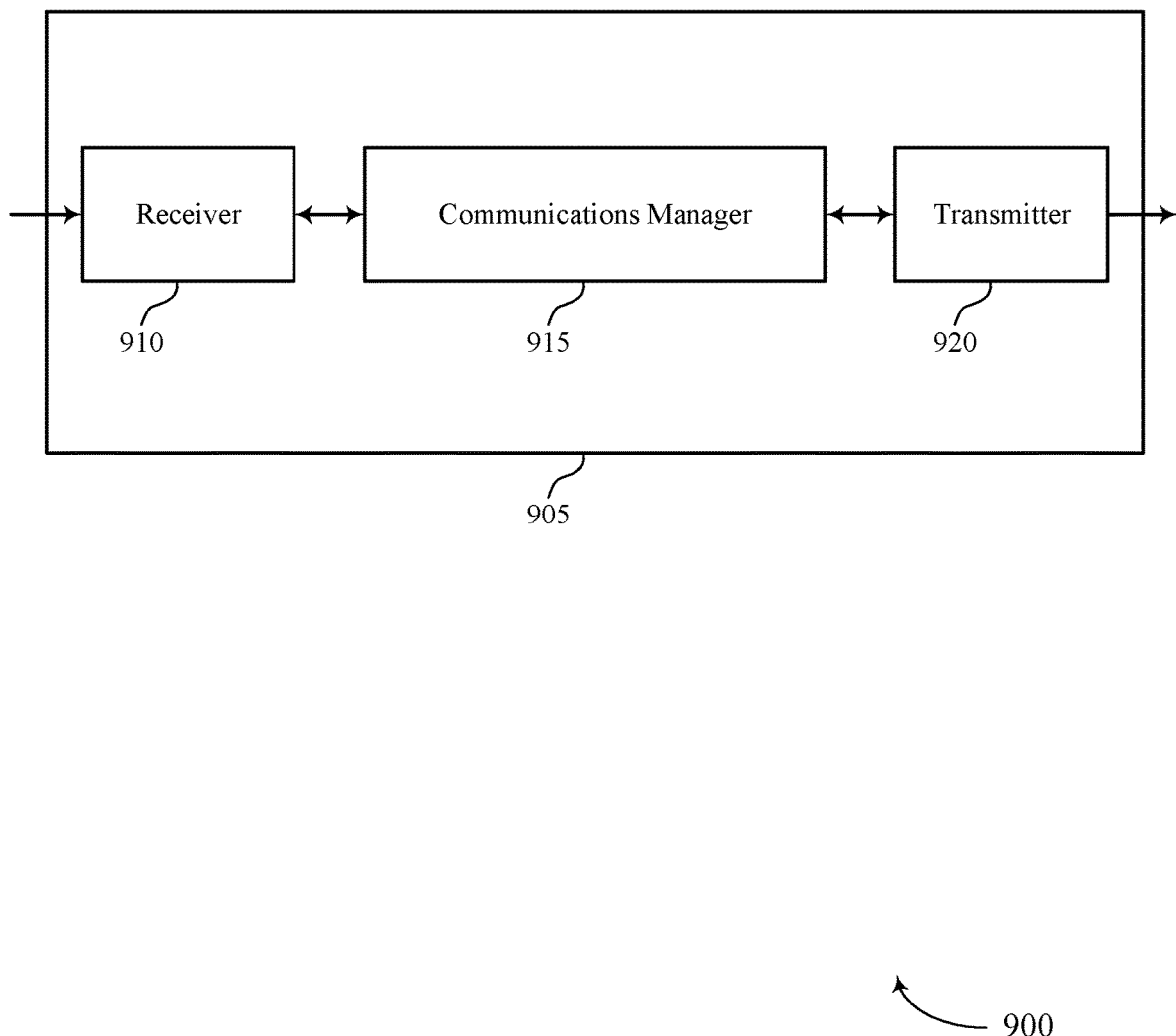
FIGS. 9 and 10 show block diagrams of devices that support channel-bandwidth-attributed per-band user equipment capability reporting in accordance with aspects of the present disclosure.

FIG. 9 shows a block diagram 900 of a device 905 that supports channel-bandwidth-attributed per-band user equipment capability reporting in accordance with aspects of the present disclosure. The device 905 may be an example of aspects of a base station 105 as described herein. The device 905 may include a receiver 910, a communications manager 915, and a transmitter 920. The device 905 may also include one or more processors, memory coupled with the one or more processors, and instructions stored in the memory that are executable by the one or more processors to enable the one or more processors to perform the channel-bandwidth-attributed per-band user equipment capability reporting features discussed herein. Each of these components may be in communication with one another (e.g., via one or more buses).

The receiver 910 may receive information such as packets, user data, or control information associated with various information channels (e.g., control channels, data channels, and information related to channel-bandwidth-attributed per-band user equipment capability reporting, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, a first UE capability report indicating a first channel bandwidth supported by the UE in a radio frequency spectrum band. The first UE capability report may include a first set of physical layer capabilities associated with the first channel bandwidth, and may receive, from the UE, a second UE capability report indicating a second channel bandwidth supported by the UE in the radio frequency spectrum band. The second UE capability report may include a second set of physical layer capabilities associated with the second channel bandwidth, and may identify a channel bandwidth to use to communicate with the UE. The identified channel bandwidth may include one of the first channel bandwidth or the second channel bandwidth, may determine, based on the identified channel bandwidth, configuration information for the UE according to the first set of physical layer capabilities or the second set of physical layer capabilities, and may transmit the determined configuration information to the UE. The communications manager 915 may be an example of aspects of the communications manager 1210 described herein. The actions performed by the communications manager 915 as described herein may be implemented to realize one or more potential advantages. One implementation may allow a base station to conserve resources and increase spectral efficiency by receiving capability reports from the UE including the physical layer capabilities and indicating the channel bandwidths thereby optimizing the use of physical layer capabilities of the UE. Another implementation may provide improved quality and reliability of service at the base station, as latency may be reduced.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
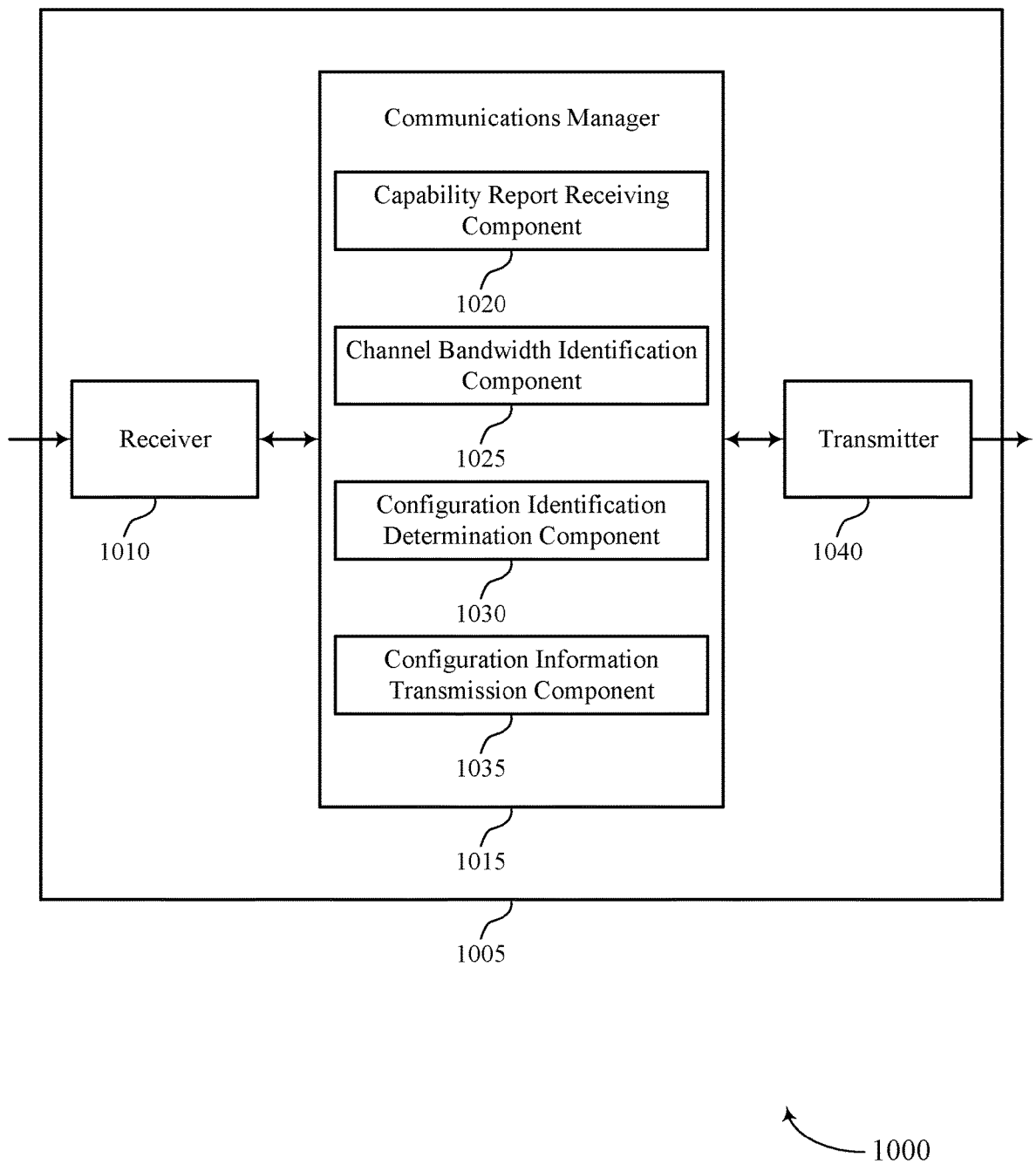

FIG. 10 shows a block diagram 1000 of a device 1005 that supports channel-bandwidth-attributed per-band user equipment capability reporting in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to channel-bandwidth-attributed per-band user equipment capability reporting, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a capability report receiving component 1020, a channel bandwidth identification component 1025, a configuration identification determination component 1030, and a configuration information transmission component 1035. The communications manager 1015 may be an example of aspects of the communications manager 1210 described herein.

The capability report receiving component 1020 may receive, from a UE, a first UE capability report indicating a first channel bandwidth supported by the UE in a radio frequency spectrum band. The first UE capability report may include a first set of physical layer capabilities associated with the first channel bandwidth and may receive, from the UE, a second UE capability report indicating a second channel bandwidth supported by the UE in the radio frequency spectrum band. The second UE capability report may include a second set of physical layer capabilities associated with the second channel bandwidth.

The channel bandwidth identification component 1025 may identify a channel bandwidth to use to communicate with the UE, the identified channel bandwidth including one of the first channel bandwidth or the second channel bandwidth. Based on identifying a channel bandwidth to use to communicate with the UE and identifying a carrier aggregation configuration for the UE, a processor of the base station (e.g., controlling the receiver 910, the transmitter 920, or the transceiver 1220 as described with reference to FIG. 12) may efficiently determine the configuration information for the UE according to the first set of physical layer capabilities or the second set of physical layer capabilities. Further, the processor of base station may transmit the determined configuration information. The processor of the base station may turn on one or more processing units for transmitting the determined configuration information, increase a processing clock, or a similar mechanism within the base station. As such, when the determined configuration information is transmitted, the processor may be ready to respond more efficiently through the reduction of a ramp up in processing power.

The configuration identification determination component 1030 may determine, based on the identified channel bandwidth, configuration information for the UE according to the first set of physical layer capabilities or the second set of physical layer capabilities.

The configuration information transmission component 1035 may transmit the determined configuration information to the UE.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

In some cases, the capability report receiving component 1020, the channel bandwidth identification component 1025, the configuration identification determination component 1030, and the configuration information transmission component 1035 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the capability report receiving component 1020, the channel bandwidth identification component 1025, the configuration identification determination component 1030, and the configuration information transmission component 1035 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
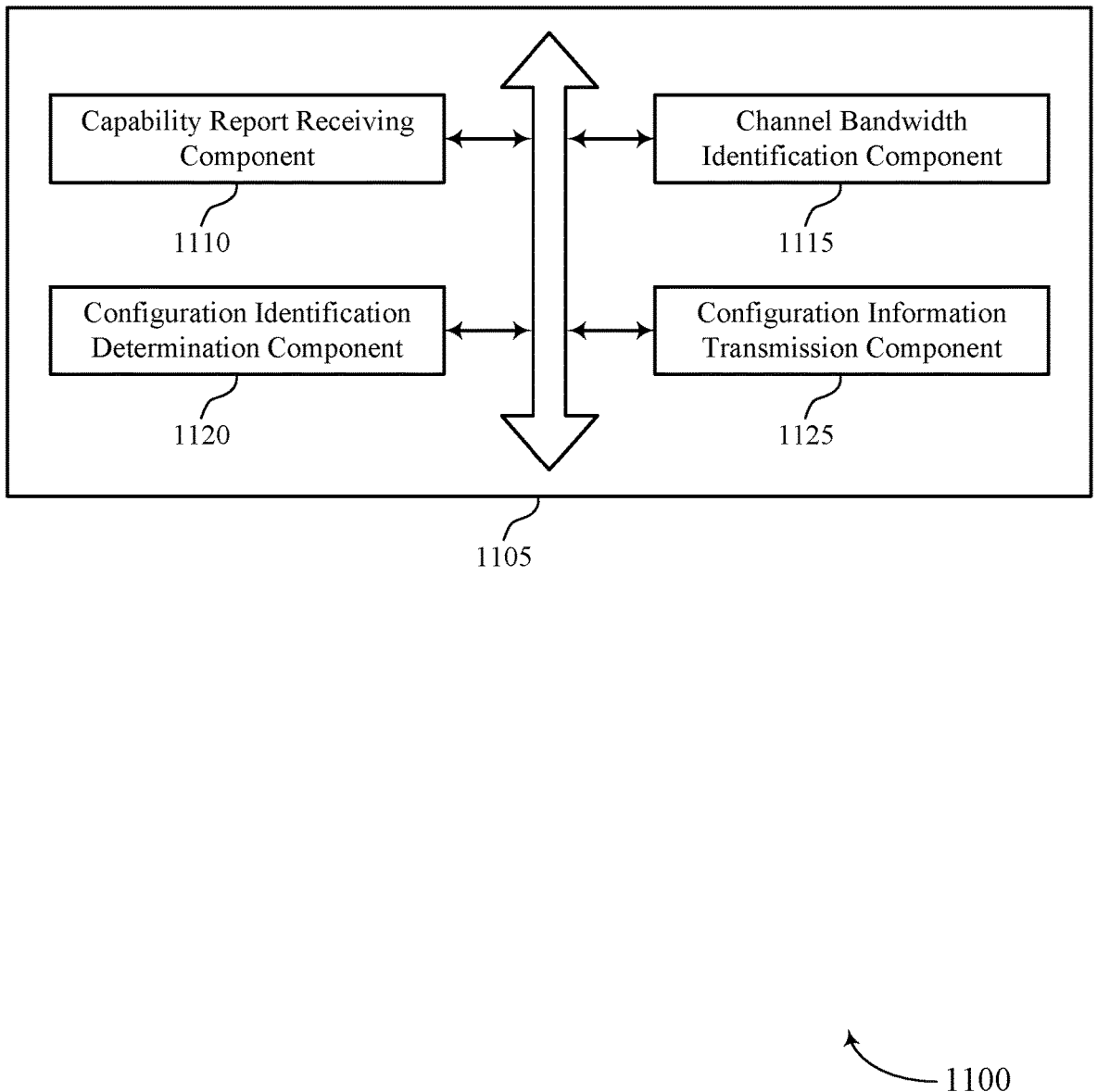
FIG. 11 shows a block diagram of a communications manager that supports channel-bandwidth-attributed per-band user equipment capability reporting in accordance with aspects of the present disclosure.

FIG. 11 shows a block diagram 1100 of a communications manager 1105 that supports channel-bandwidth-attributed per-band user equipment capability reporting in accordance with aspects of the present disclosure. The communications manager 1105 may be an example of aspects of a communications manager 915, a communications manager 1015, or a communications manager 1210 described herein. The communications manager 1105 may include a capability report receiving component 1110, a channel bandwidth identification component 1115, a configuration identification determination component 1120, and a configuration information transmission component 1125. Each of these modules may communicate, directly or indirectly, with one another (e.g., via one or more buses).

The capability report receiving component 1110 may receive, from a UE, a first UE capability report indicating a first channel bandwidth supported by the UE in a radio frequency spectrum band, the first UE capability report including a first set of physical layer capabilities associated with the first channel bandwidth. In some examples, the capability report receiving component 1110 may receive, from the UE, a second UE capability report indicating a second channel bandwidth supported by the UE in the radio frequency spectrum band, the second UE capability report including a second set of physical layer capabilities associated with the second channel bandwidth.

The channel bandwidth identification component 1115 may identify a channel bandwidth to use to communicate with the UE, the identified channel bandwidth including one of the first channel bandwidth or the second channel bandwidth.

The configuration identification determination component 1120 may determine, based on the identified channel bandwidth, configuration information for the UE according to the first set of physical layer capabilities or the second set of physical layer capabilities.

The configuration information transmission component 1125 may transmit the determined configuration information to the UE.

In some cases, the capability report receiving component 1110, the channel bandwidth identification component 1115, the configuration identification determination component 1120, and the configuration information transmission component 1125 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the capability report receiving component 1110, the channel bandwidth identification component 1115, the configuration identification determination component 1120, and the configuration information transmission component 1125 discussed herein.

Figure 12:
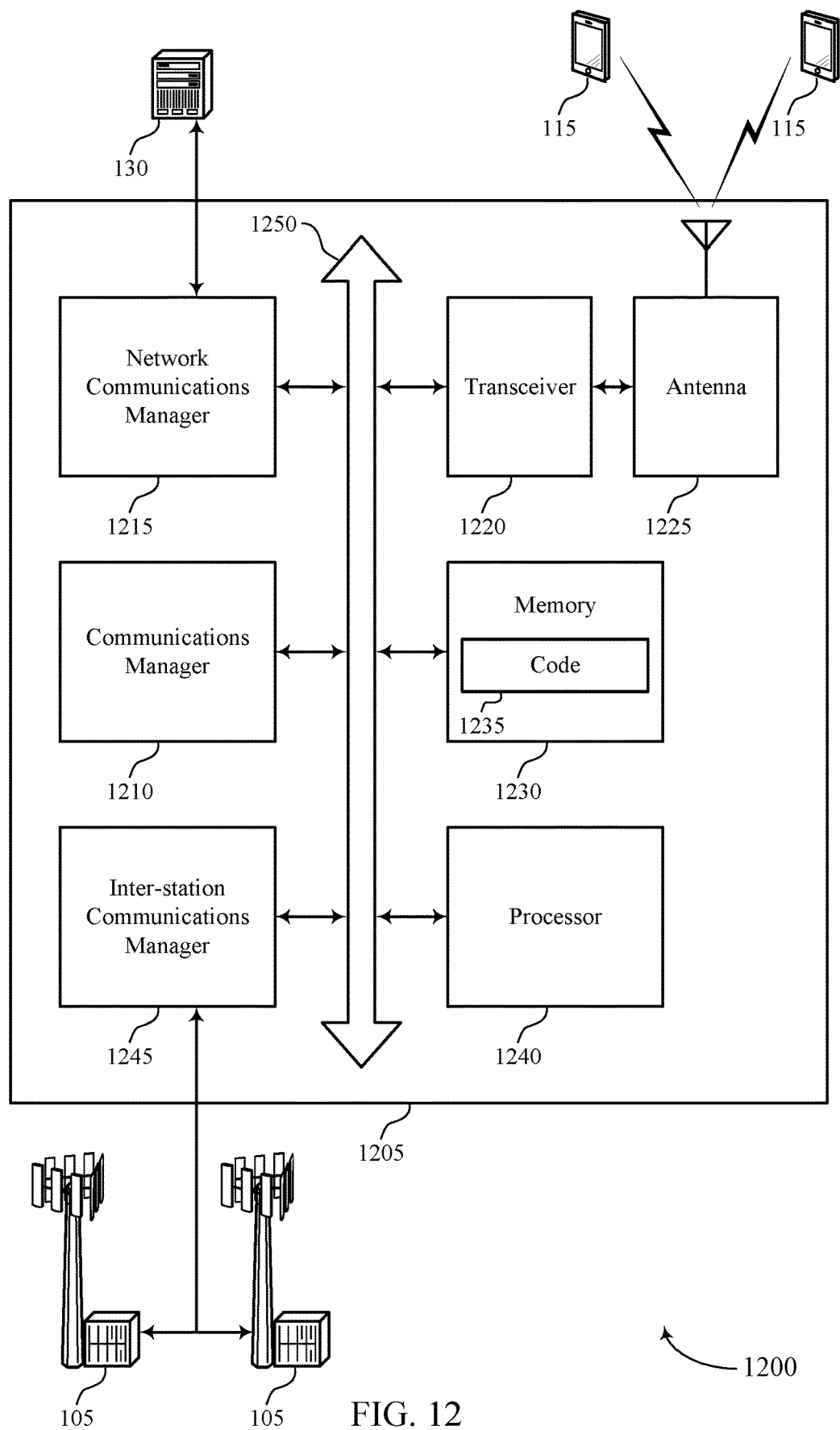
FIG. 12 shows a diagram of a system including a device that supports channel-bandwidth-attributed per-band user equipment capability reporting in accordance with aspects of the present disclosure.

FIG. 12 shows a diagram of a system 1200 including a device 1205 that supports channel-bandwidth-attributed per-band user equipment capability reporting in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, a first UE capability report indicating a first channel bandwidth supported by the UE in a radio frequency spectrum band. The first UE capability report may include a first set of physical layer capabilities associated with the first channel bandwidth, and may receive, from the UE, a second UE capability report indicating a second channel bandwidth supported by the UE in the radio frequency spectrum band. The second UE capability report may include a second set of physical layer capabilities associated with the second channel bandwidth, and may identify a channel bandwidth to use to communicate with the UE. The identified channel bandwidth may include one of the first channel bandwidth or the second channel bandwidth, may determine, based on the identified channel bandwidth, configuration information for the UE according to the first set of physical layer capabilities or the second set of physical layer capabilities, and may transmit the determined configuration information to the UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases, the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting channel-bandwidth-attributed per-band user equipment capability reporting).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
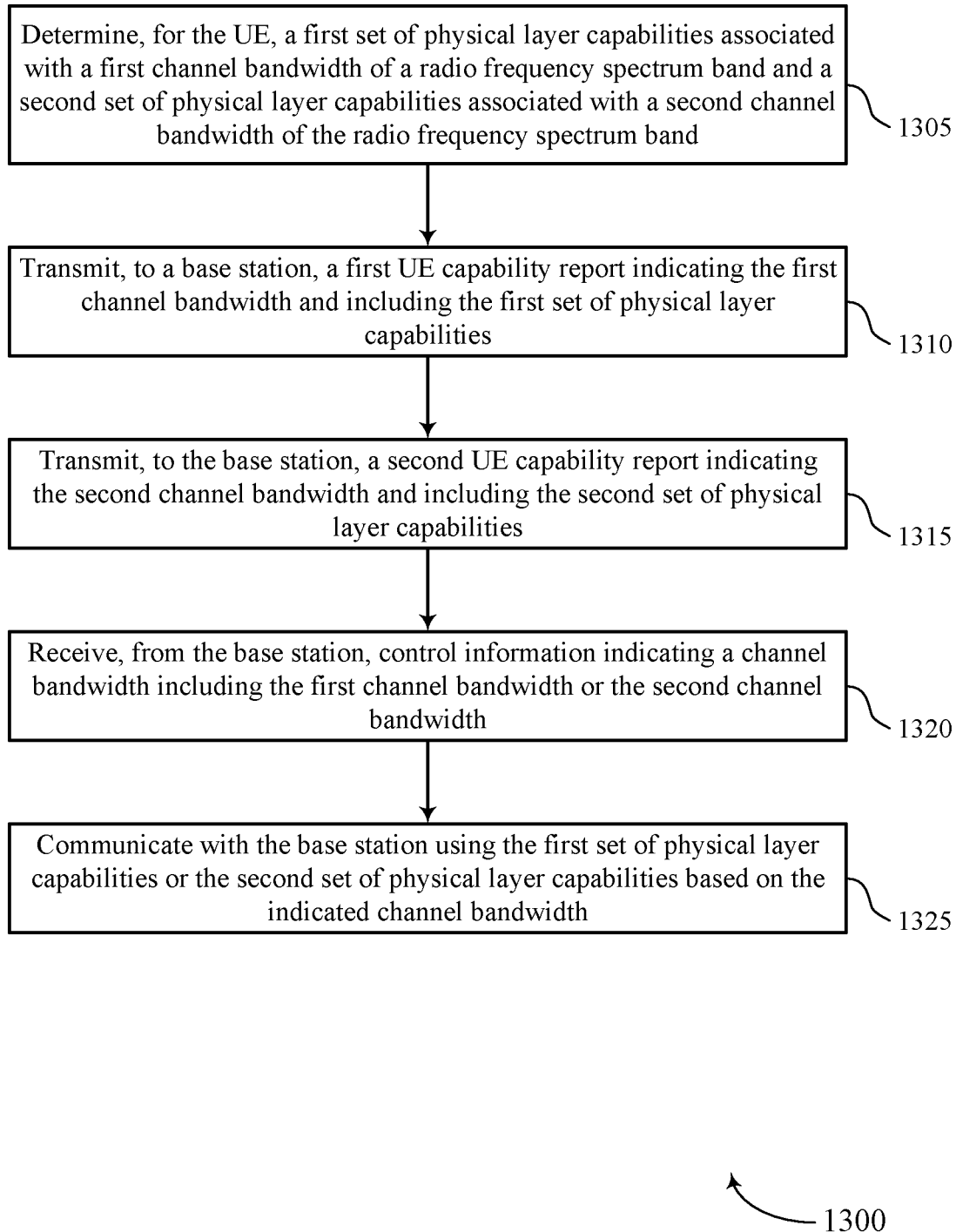
FIGS. 13 through 15 show flowcharts illustrating methods that support channel-bandwidth-attributed per-band user equipment capability reporting in accordance with aspects of the present disclosure.

FIG. 13 shows a flowchart illustrating a method 1300 that supports channel-bandwidth-attributed per-band user equipment capability reporting in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may determine, for the UE, a first set of physical layer capabilities associated with a first channel bandwidth of a radio frequency spectrum band and a second set of physical layer capabilities associated with a second channel bandwidth of the radio frequency spectrum band. The operations of 1305 may be performed according to the methods described herein. In some examples, aspects of the operations of 1305 may be performed by a physical layer capability determination component as described with reference to FIGS. 5 through 8.

At 1310, the UE may transmit, to a base station, a first UE capability report indicating the first channel bandwidth and including the first set of physical layer capabilities. The operations of 1310 may be performed according to the methods described herein. In some examples, aspects of the operations of 1310 may be performed by a capability report transmission component as described with reference to FIGS. 5 through 8.

At 1315, the UE may transmit, to the base station, a second UE capability report indicating the second channel bandwidth and including the second set of physical layer capabilities. The operations of 1315 may be performed according to the methods described herein. In some examples, aspects of the operations of 1315 may be performed by a capability report transmission component as described with reference to FIGS. 5 through 8.

At 1320, the UE may receive, from the base station, control information indicating a channel bandwidth including the first channel bandwidth or the second channel bandwidth. The operations of 1320 may be performed according to the methods described herein. In some examples, aspects of the operations of 1320 may be performed by a control information receiving component as described with reference to FIGS. 5 through 8.

At 1325, the UE may communicate with the base station using the first set of physical layer capabilities or the second set of physical layer capabilities based on the indicated channel bandwidth. The operations of 1325 may be performed according to the methods described herein. In some examples, aspects of the operations of 1325 may be performed by a physical layer capability communication component as described with reference to FIGS. 5 through 8.

Figure 14:
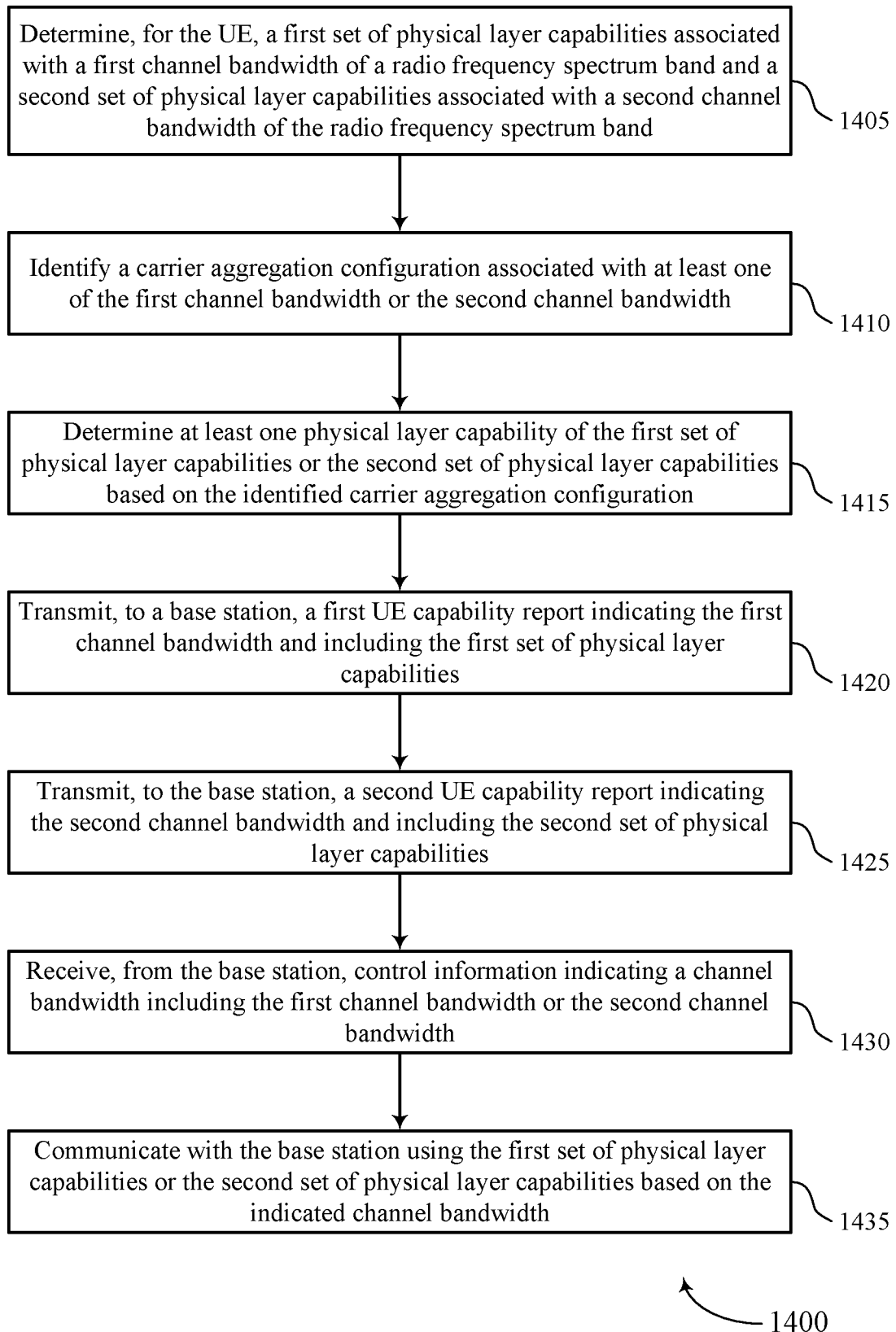

FIG. 14 shows a flowchart illustrating a method 1400 that supports channel-bandwidth-attributed per-band user equipment capability reporting in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may determine, for the UE, a first set of physical layer capabilities associated with a first channel bandwidth of a radio frequency spectrum band and a second set of physical layer capabilities associated with a second channel bandwidth of the radio frequency spectrum band. The operations of 1405 may be performed according to the methods described herein. In some examples, aspects of the operations of 1405 may be performed by a physical layer capability determination component as described with reference to FIGS. 5 through 8.

At 1410, the UE may identify a carrier aggregation configuration associated with at least one of the first channel bandwidth or the second channel bandwidth. The operations of 1410 may be performed according to the methods described herein. In some examples, aspects of the operations of 1410 may be performed by a carrier aggregation identification component as described with reference to FIGS. 5 through 8.

At 1415, the UE may determine at least one physical layer capability of the first set of physical layer capabilities, or the second set of physical layer capabilities based on the identified carrier aggregation configuration. The operations of 1415 may be performed according to the methods described herein. In some examples, aspects of the operations of 1415 may be performed by a physical layer capability determination component as described with reference to FIGS. 5 through 8.

At 1420, the UE may transmit, to a base station, a first UE capability report indicating the first channel bandwidth and including the first set of physical layer capabilities. The operations of 1420 may be performed according to the methods described herein. In some examples, aspects of the operations of 1420 may be performed by a capability report transmission component as described with reference to FIGS. 5 through 8.

At 1425, the UE may transmit, to the base station, a second UE capability report indicating the second channel bandwidth and including the second set of physical layer capabilities. The operations of 1425 may be performed according to the methods described herein. In some examples, aspects of the operations of 1425 may be performed by a capability report transmission component as described with reference to FIGS. 5 through 8.

At 1430, the UE may receive, from the base station, control information indicating a channel bandwidth including the first channel bandwidth or the second channel bandwidth. The operations of 1430 may be performed according to the methods described herein. In some examples, aspects of the operations of 1430 may be performed by a control information receiving component as described with reference to FIGS. 5 through 8.

At 1435, the UE may communicate with the base station using the first set of physical layer capabilities or the second set of physical layer capabilities based on the indicated channel bandwidth. The operations of 1435 may be performed according to the methods described herein. In some examples, aspects of the operations of 1435 may be performed by a physical layer capability communication component as described with reference to FIGS. 5 through 8.

Figure 15:
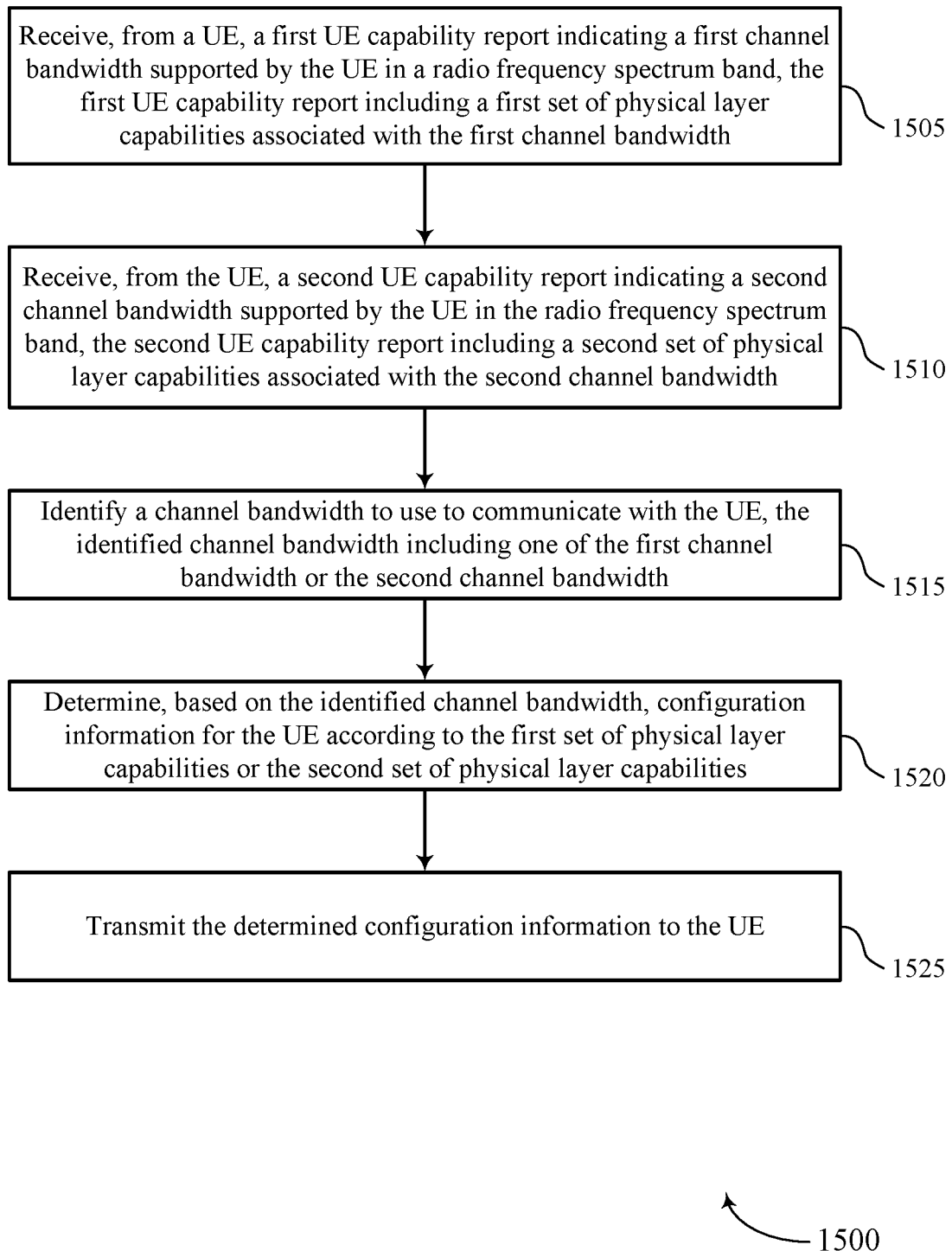

FIG. 15 shows a flowchart illustrating a method 1500 that supports channel-bandwidth-attributed per-band user equipment capability reporting in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may receive, from a UE, a first UE capability report indicating a first channel bandwidth supported by the UE in a radio frequency spectrum band, the first UE capability report including a first set of physical layer capabilities associated with the first channel bandwidth. The operations of 1505 may be performed according to the methods described herein. In some examples, aspects of the operations of 1505 may be performed by a capability report receiving component as described with reference to FIGS. 9 through 12.

At 1510, the base station may receive, from the UE, a second UE capability report indicating a second channel bandwidth supported by the UE in the radio frequency spectrum band, the second UE capability report including a second set of physical layer capabilities associated with the second channel bandwidth. The operations of 1510 may be performed according to the methods described herein. In some examples, aspects of the operations of 1510 may be performed by a capability report receiving component as described with reference to FIGS. 9 through 12.

At 1515, the base station may identify a channel bandwidth to use to communicate with the UE, the identified channel bandwidth including one of the first channel bandwidth or the second channel bandwidth. The operations of 1515 may be performed according to the methods described herein. In some examples, aspects of the operations of 1515 may be performed by a channel bandwidth identification component as described with reference to FIGS. 9 through 12.

At 1520, the base station may determine, based on the identified channel bandwidth, configuration information for the UE according to the first set of physical layer capabilities or the second set of physical layer capabilities. The operations of 1520 may be performed according to the methods described herein. In some examples, aspects of the operations of 1520 may be performed by a configuration identification determination component as described with reference to FIGS. 9 through 12.

At 1525, the base station may transmit the determined configuration information to the UE. The operations of 1525 may be performed according to the methods described herein. In some examples, aspects of the operations of 1525 may be performed by a configuration information transmission component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

transmitting, to a base station, a first UE capability report indicating a first channel bandwidth of a radio frequency spectrum band and comprising a first set of physical layer capabilities supported by the UE, the first set of physical layer capabilities associated with communications in the first channel bandwidth;

transmitting, to the base station, a second UE capability report indicating a second channel bandwidth of the radio frequency spectrum band and comprising a second set of physical layer capabilities supported by the UE, the second set of physical layer capabilities associated with communications in the second channel bandwidth, wherein at least one of the first set of physical layer capabilities or the second set of physical layer capabilities comprises at least one physical layer capability determined based at least in part on a carrier aggregation configuration associated with at least one of the first channel bandwidth or the second channel bandwidth;

receiving, from the base station, control information indicating a channel bandwidth comprising the first channel bandwidth or the second channel bandwidth, the control information based at least in part on the first set of physical layer capabilities or the second set of physical layer capabilities for the indicated channel bandwidth, wherein the at least one physical layer capability of the first set of physical layer capabilities or the second set of physical layer capabilities comprises a synchronization signal block for beam measurement capability, or a channel state information (CSI) reference signal for beam measurement capability, or a beam failure report capability, or a CSI reference signal for CSI report capability, or a CSI reference signal for CSI interference measurement capability, or a CSI processing unit, or a combination thereof; and communicating with the base station according to the received control information.

2. The method of claim 1, wherein:

the carrier aggregation configuration comprises a plurality of component carriers within the radio frequency spectrum band; and determining the first set of physical layer capabilities comprises repeating, for each component carrier of the plurality of component carriers, capability information for a component carrier in the first UE capability report, or determining the second set of physical layer capabilities comprises repeating, for each component carrier of the plurality of component carriers, capability information for a component carrier in the second UE capability report, or both.

3. The method of claim 1, wherein the carrier aggregation configuration comprises a plurality of component carriers, including a first component carrier in the radio frequency spectrum band and a second component carrier in a second radio frequency spectrum band, the method further comprising:
  identifying a first value for a physical layer capability associated with the first component carrier;
  identifying a second value for the physical layer capability associated with the first component carrier; and
  determining that the first value is greater than the second value, wherein the UE communicates with the base station using the first value based at least in part on determining that the first value is greater than the second value.

4. The method of claim 1, wherein at least one capability of the first set of physical layer capabilities and the second set of physical layer capabilities comprises a modified power reduction, or a power class, or a maximum uplink duty cycle, or a multiple-input multiple-output parameter per band, or a bandwidth part feature, or a combination thereof.

5. The method of claim 1, wherein a first value of at least one capability in the first set of physical layer capabilities different than a second value of the at least one capability in the second set of physical layer capabilities.

6. The method of claim 1, wherein:
  transmitting the first UE capability report comprises transmitting the first UE capability report in radio resource control signaling; and
  transmitting the second UE capability report comprises transmitting the second UE capability report in radio resource control signaling.

7. A method for wireless communication at a base station, comprising:
  receiving, from a user equipment (UE), a first UE capability report indicating a first channel bandwidth is supported by the UE in a radio frequency spectrum band, the first UE capability report comprising a first set of physical layer capabilities associated with communications in the first channel bandwidth;
  receiving, from the UE, a second UE capability report indicating a second channel bandwidth is supported by the UE in the radio frequency spectrum band, the second UE capability report comprising a second set of physical layer capabilities associated with communications in the second channel bandwidth; and
  transmitting, to the UE, configuration information for the UE, wherein the configuration information is determined according to the first set of physical layer capabilities or the second set of physical layer capabilities and is determined based at least in part on a channel bandwidth to use to communicate with the UE and based at least in part on repeated capability information for a component carrier in the first UE capability report, or the second UE capability report, or both, the channel bandwidth comprising one of the first channel bandwidth or the second channel bandwidth.

8. The method of claim 7, further comprising:
  identifying a carrier aggregation configuration for the UE; and
  determining, based at least in part on the channel bandwidth and the carrier aggregation configuration, the configuration information for the UE according to the first set of physical layer capabilities or the second set of physical layer capabilities.

9. The method of claim 8, wherein the identified carrier aggregation configuration comprises a plurality of component carriers, including a first component carrier in the radio frequency spectrum band and a second component carrier in a second radio frequency spectrum band, the method further comprising:
  identifying a first value for a physical layer capability associated with the first component carrier;
  identifying a second value for the physical layer capability associated with the first component carrier; and
  determining that the first value is greater than the second value, wherein the configuration information for the UE is determined using the first value based at least in part on determining that the first value is greater than the second value.

10. The method of claim 8, wherein at least one capability of the first set of physical layer capabilities or the second set of physical layer capabilities comprises a synchronization signal block for beam measurement capability, or a channel state information (CSI) reference signal for beam measurement capability, or a beam failure report capability, or a CSI reference signal for CSI report capability, or a CSI reference signal for CSI interference measurement capability, or a CSI processing unit, or a combination thereof.

11. The method of claim 7, further comprising:
  determining a combined UE capability report based at least in part on the received first UE capability report and the received second UE capability report.

12. The method of claim 7, wherein the first UE capability report comprises an indication of the radio frequency spectrum band associated with the first channel bandwidth, and the second UE capability report comprises the indication of the radio frequency spectrum band associated with the second channel bandwidth.

13. The method of claim 12, wherein the indication of the radio frequency spectrum band comprises a same band number associated with the first channel bandwidth and the second channel bandwidth.

14. The method of claim 7, wherein a first value of at least one capability in the first set of physical layer capabilities is different than a second value of the at least one capability in the second set of physical layer capabilities.

15. The method of claim 14, wherein the at least one capability comprises a modified power reduction, or a power class, or a maximum uplink duty cycle, or a multiple-input multiple-output parameter per band, or a bandwidth part feature, or a combination thereof.

16. The method of claim 7, further comprising:
  receiving the first UE capability report comprises receiving the first UE capability report in radio resource control signaling; and
  receiving the second UE capability report comprises receiving the second UE capability report in radio resource control signaling.

17. An apparatus for wireless communication at a user equipment (UE), comprising:
  a processor,
  memory coupled with the processor; and
  instructions stored in the memory and executable by the processor to cause the apparatus to:
    transmit, to a base station, a first UE capability report indicating a first channel bandwidth of a radio frequency spectrum band and comprising a first set of physical layer capabilities supported by the UE, the first set of physical layer capabilities associated with communications in the first channel bandwidth;
    transmit, to the base station, a second UE capability report indicating a second channel bandwidth of the radio frequency spectrum band and comprising a second set of physical layer capabilities supported by the UE, the second set of physical layer capabilities associated with communications in the second channel bandwidth, wherein at least one of the first set of physical layer capabilities or the second set of physical layer capabilities comprises at least one physical layer capability determined based at least in part on a carrier aggregation configuration associated with at least one of the first channel bandwidth or the second channel bandwidth;

receive, from the base station, control information indicating a channel bandwidth comprising the first channel bandwidth or the second channel bandwidth, the control information based at least in part on the first set of physical layer capabilities or the second set of physical layer capabilities for the indicated channel bandwidth, wherein the at least one physical layer capability of the first set of physical layer capabilities or the second set of physical layer capabilities comprises a synchronization signal block for beam measurement capability, or a channel state information (CSI) reference signal for beam measurement capability, or a beam failure report capability, or a CSI reference signal for CSI report capability, or a CSI reference signal for CSI interference measurement capability, or a CSI processing unit, or a combination thereof; and communicate with the base station using the first set of physical layer capabilities or the second set of physical layer capabilities based at least in part on the indicated channel bandwidth.

18. The apparatus of claim 17, wherein:
the carrier aggregation configuration comprises a plurality of component carriers within the radio frequency spectrum band; and
determining the first set of physical layer capabilities comprises repeating, for each component carrier of the plurality of component carriers, capability information for a component carrier in the first UE capability report, or
determining the second set of physical layer capabilities comprises repeating, for each component carrier of the plurality of component carriers, capability information for a component carrier in the second UE capability report, or
both.

19. The apparatus of claim 17, wherein the carrier aggregation configuration comprises a plurality of component carriers, and the instructions are further executable by the processor to cause the apparatus to:
identify a first value for a physical layer capability associated with a first component carrier;
identify a second value for the physical layer capability associated with the first component carrier; and
determine that the first value is greater than the second value, wherein the UE communicates with the base station using the first value based at least in part on determining that the first value is greater than the second value.

20. The apparatus of claim 17, wherein at least one capability of the first set of physical layer capabilities and the second set of physical layer capabilities comprises a modified power reduction, or a power class, or a maximum uplink duty cycle, or a multiple-input multiple-output parameter per band, or a bandwidth part feature, or a combination thereof.

21. The apparatus of claim 17, wherein a first value of at least one capability in the first set of physical layer capabilities is different than a second value of the at least one capability in the second set of physical layer capabilities.

22. The apparatus of claim 17, wherein:
the instructions to transmit the first UE capability report are executable by the processor to cause the apparatus to transmit the first UE capability report in radio resource control signaling; and
the instructions to transmit the second UE capability report are executable by the processor to cause the apparatus to transmit the second UE capability report in radio resource control signaling.

23. An apparatus for wireless communication at a base station, comprising:
a processor,
memory coupled with the processor; and
instructions stored in the memory and executable by the processor to cause the apparatus to:
receive, from a user equipment (UE), a first UE capability report indicating a first channel bandwidth is supported by the UE in a radio frequency spectrum band, the first UE capability report comprising a first set of physical layer capabilities associated with communications in the first channel bandwidth;
receive, from the UE, a second UE capability report indicating a second channel bandwidth is supported by the UE in the radio frequency spectrum band, the second UE capability report comprising a second set of physical layer capabilities associated with communications in the second channel bandwidth;
transmit, to the UE, configuration information for the UE, wherein the configuration information is determined according to the first set of physical layer capabilities or the second set of physical layer capabilities and is determined based at least in part on a channel bandwidth to use to communicate with the UE and based at least in part on repeated capability information for a component carrier in the first UE capability report, or the second UE capability report, or both, the channel bandwidth comprising one of the first channel bandwidth or the second channel bandwidth.

24. The apparatus of claim 23, wherein the instructions are further executable by the processor to:
identify a carrier aggregation configuration for the UE; and
determine, based at least in part on the channel bandwidth and the carrier aggregation configuration, the configuration information for the UE according to the first set of physical layer capabilities or the second set of physical layer capabilities.

* * * * *